(12) United States Patent
Wang et al.

(10) Patent No.: US 11,889,431 B2
(45) Date of Patent: Jan. 30, 2024

(54) POWER CONTROL FOR SIDELINK FEEDBACK TRANSMISSIONS

(71) Applicant: QUALCOMM Incorporated, San Diego, CA (US)

(72) Inventors: Xiaojie Wang, Hillsborough, NJ (US); Xiaoxia Zhang, San Diego, CA (US); Piyush Gupta, Bridgewater, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/643,082

(22) Filed: Dec. 7, 2021

(65) Prior Publication Data

US 2023/0180140 A1 Jun. 8, 2023

(51) Int. Cl.
*H04W 52/24* (2009.01)
*H04W 52/10* (2009.01)
*H04L 5/00* (2006.01)
*H04W 72/04* (2023.01)
*H04W 52/26* (2009.01)
*H04W 72/20* (2023.01)
*H04W 72/044* (2023.01)

(52) U.S. Cl.
CPC ......... *H04W 52/242* (2013.01); *H04L 5/0037* (2013.01); *H04W 52/10* (2013.01); *H04W 52/262* (2013.01); *H04W 72/044* (2013.01); *H04W 72/20* (2023.01)

(58) Field of Classification Search
CPC . H04W 52/242; H04W 52/10; H04W 52/262; H04W 72/044; H04W 72/20; H04L 5/0037
See application file for complete search history.

(56) References Cited

U.S. PATENT DOCUMENTS

2020/0305126 A1\* 9/2020 Li ............................ H04L 1/0027
2021/0051594 A1\* 2/2021 Chae ...................... H04W 80/02
2022/0408373 A1\* 12/2022 Castañeda Garcia ........................
H04W 72/20

FOREIGN PATENT DOCUMENTS

TW         I508590 B   * 11/2015  ............ H04W 72/21

\* cited by examiner

*Primary Examiner* — Jianye Wu
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive a configuration for sidelink feedback power control. The UE may transmit a sidelink feedback transmission, in accordance with the configuration, using a transmit power that is based at least in part on at least one of: a quantity of resource blocks (RBs) associated with the sidelink feedback transmission, a quantity of symbols associated with the sidelink feedback transmission, a sidelink pathloss value, or a size of the sidelink feedback transmission. Numerous other aspects are provided.

30 Claims, 8 Drawing Sheets

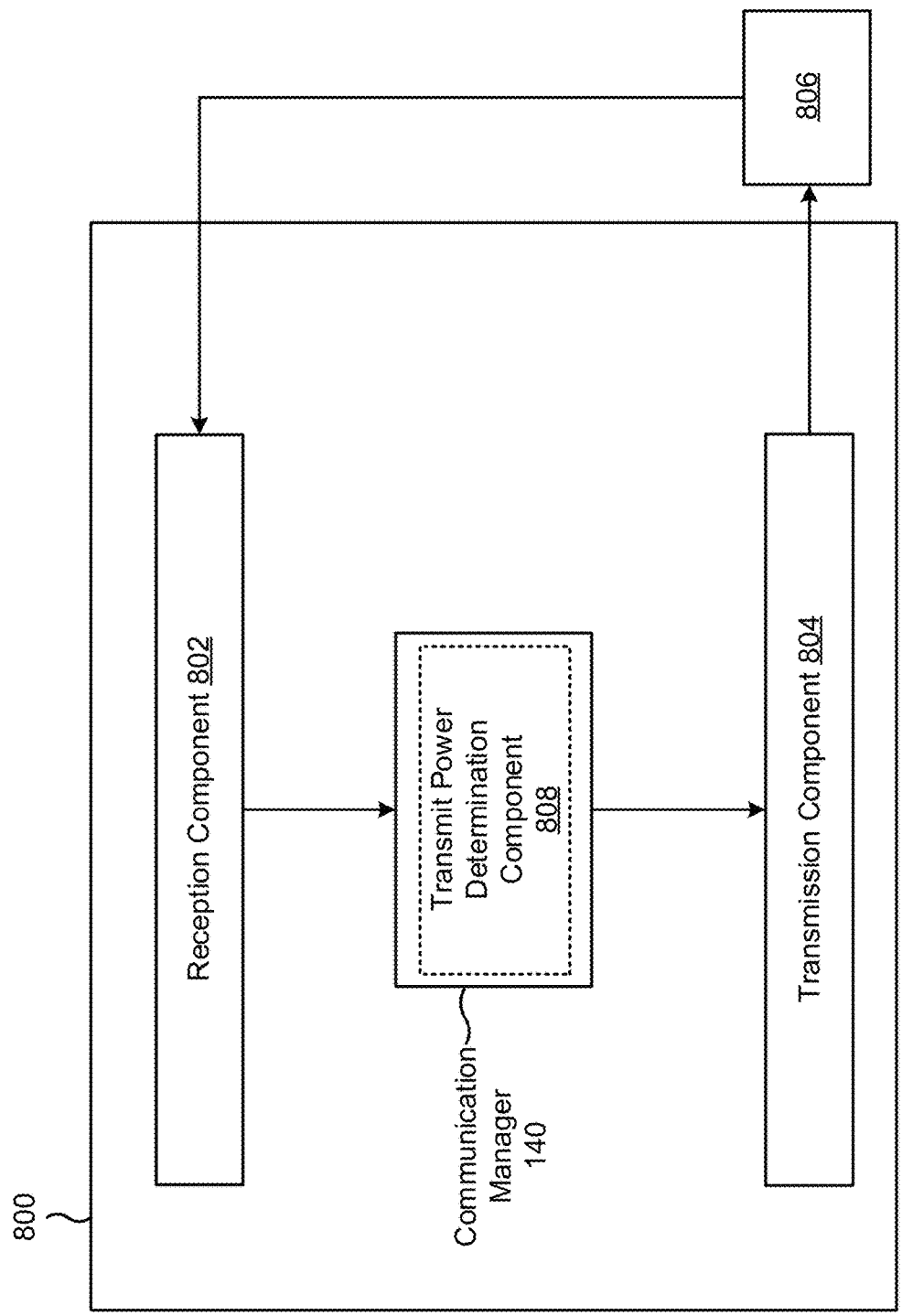

POWER CONTROL FOR SIDELINK FEEDBACK TRANSMISSIONS

FIELD OF THE DISCLOSURE

Aspects of the present disclosure generally relate to wireless communication and, specifically, to techniques and apparatuses for power control for sidelink feedback transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, two or more user equipments (UEs) may communicate directly using one or more sidelink channels (for example, without using a base station as an intermediary to communicate with one another). One example of a sidelink channel is a physical sidelink feedback channel (PSFCH). A PSFCH may be used to communicate sidelink feedback, such as hybrid automatic repeat request (HARQ) feedback (for example, acknowledgement or negative acknowledgement (ACK/NACK) information). A UE may determine a transmit power for a PSFCH transmission using open-loop power control or closed-loop power control. For example, the UE may determine a transmit power for a PSFCH transmission based at least in part on a nominal transmit power level (for example, that is configured for the PSFCH or for a resource pool associated with the PSFCH), a scaling factor that is based at least in part on the subcarrier spacing that is configured for the resource pool associated with the PSFCH, or an offset value for downlink pathloss, among other examples.

Because a PSFCH transmission (for example, that includes ACK/NACK feedback) may include only a single bit of information and may occupy only a single resource block (RB), the PSFCH transmission may have poor reliability. For example, the single-bit, single-RB PSFCH transmissions may have an insufficient reliability for some sidelink applications, such as an industrial Internet of Things (IIoT) application. Therefore, a PSFCH format may be used by the UE to transmit a PSFCH transmission in which the PSFCH transmission occupies multiple RBs (for example, in the frequency domain) or multiple symbols (for example, in the time domain) to improve a reliability of the PSFCH transmission. Additionally or alternatively, a size of the PSFCH transmission may be increased (for example, to larger than 1 bit) to carry additional information, such as multiple HARQ feedback messages, channel state information (CSI), or inter-UE coordination messages, among other examples. But because existing transmit power control techniques may use only a nominal transmit power, a scaling factor that is based at least in part on the subcarrier spacing, and an offset value for downlink pathloss, a poor transmit power determination may result for a multi-RB, multi-symbol, or multi-bit PSFCH transmission. For example, using transmit power control that considers only the nominal transmit power, the scaling factor, and the offset value may result in a reliability of the PSFCH transmission varying based at least in part on a size of the PSFCH transmission.

SUMMARY

Some aspects described herein relate to a user equipment (UE) for wireless communication. The UE may include at least one processor and at least one memory, communicatively coupled with the at least one processor, that stores processor-readable code. The processor-readable code, when executed by the at least one processor, may be configured to cause the UE to receive a configuration for sidelink feedback power control. The processor-readable code, when executed by the at least one processor, may be configured to cause the UE to transmit a sidelink feedback transmission, in accordance with the configuration, using a transmit power that is based at least in part on at least one of: a quantity of resource blocks (RBs) associated with the sidelink feedback transmission, a quantity of symbols associated with the sidelink feedback transmission, a sidelink pathloss value, or a size of the sidelink feedback transmission.

Some aspects described herein relate to a method of wireless communication performed by a UE. The method may include receiving a configuration for sidelink feedback power control. The method may include transmitting a sidelink feedback transmission, in accordance with the configuration, using a transmit power that is based at least in part on at least one of: a quantity of RBs associated with the sidelink feedback transmission, a quantity of symbols associated with the sidelink feedback transmission, a sidelink pathloss value, or a size of the sidelink feedback transmission.

Some aspects described herein relate to a non-transitory computer-readable medium that stores a set of instructions for wireless communication by a UE. The set of instructions, when executed by one or more processors of the UE, may cause the UE to receive a configuration for sidelink feedback power control. The set of instructions, when executed by one or more processors of the UE, may cause the UE to transmit a sidelink feedback transmission, in accordance with the configuration, using a transmit power that is based at least in part on at least one of: a quantity of RBs associated with the sidelink feedback transmission, a quantity of symbols associated with the sidelink feedback transmission, a sidelink pathloss value, or a size of the sidelink feedback transmission.

Some aspects described herein relate to an apparatus for wireless communication. The apparatus may include means for receiving a configuration for sidelink feedback power control. The apparatus may include means for transmitting a sidelink feedback transmission, in accordance with the configuration, using a transmit power that is based at least in part on at least one of: a quantity of RBs associated with the sidelink feedback transmission, a quantity of symbols associated with the sidelink feedback transmission, a sidelink pathloss value, or a size of the sidelink feedback transmission.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 8 is a diagram of an example apparatus for wireless communication that performs operations associated with power control for sidelink feedback transmissions, in accordance with the present disclosure.

DETAILED DESCRIPTION

Figure 1:
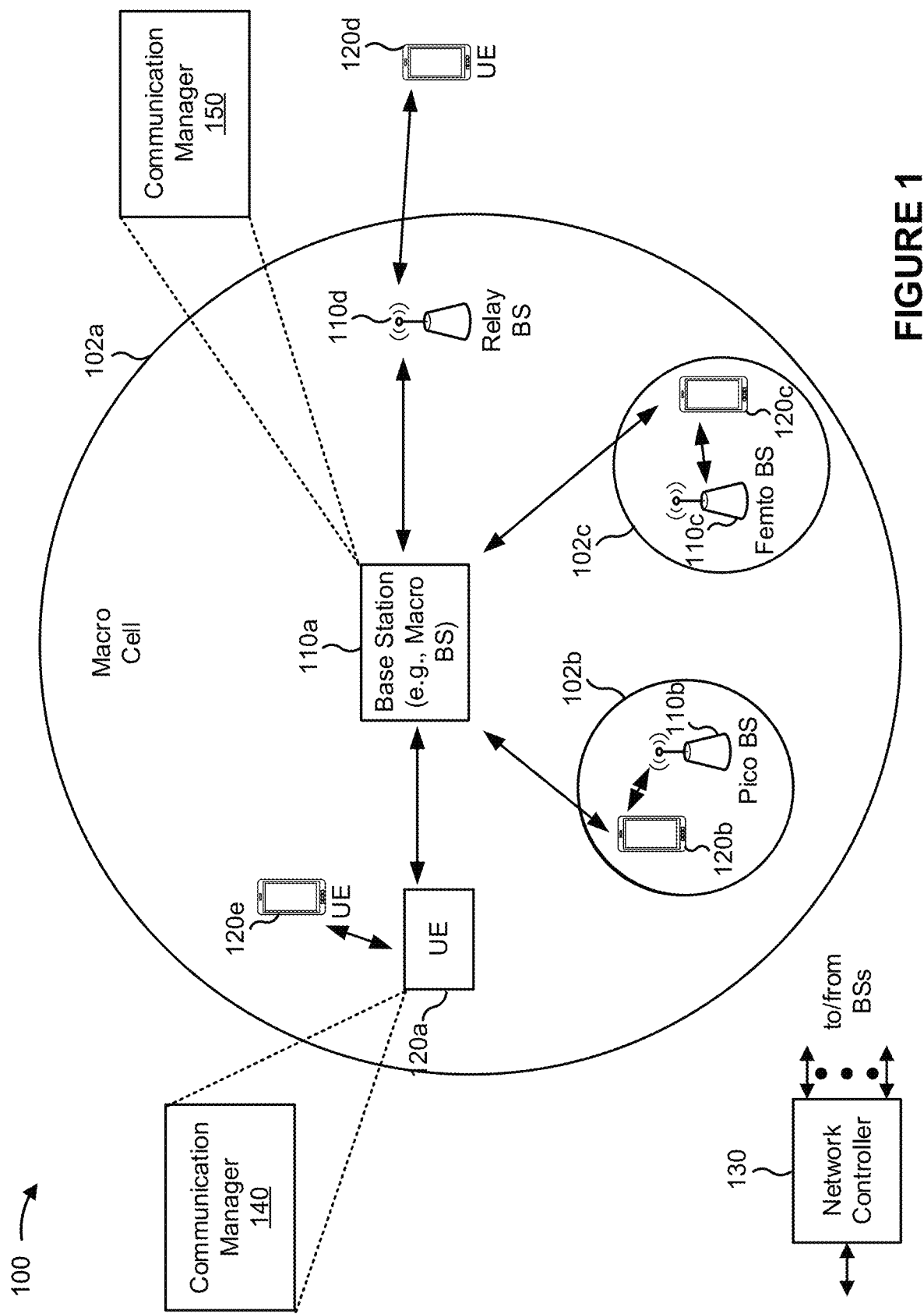
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to enhanced power control for sidelink feedback transmissions. Some aspects more specifically relate to transmit power control for sidelink feedback transmissions that span multiple resource blocks (RBs), span multiple symbols, or include multiple bits. In some aspects, a user equipment (UE) may transmit a sidelink feedback transmission (for example, a physical sidelink feedback channel (PSFCH) transmission), using a transmit power that is based at least in part on a quantity of RBs associated with the sidelink feedback transmission, a quantity of symbols associated with the sidelink feedback transmission, a sidelink pathloss value, or a size of the sidelink feedback transmission. In some aspects, the UE may receive a configuration associated with power control for the PSFCH (for example, that is used to transmit the sidelink feedback transmission).

In some aspects, the UE may adjust the transmit power (for example, adjust the nominal transmit power for sidelink transmissions) based at least in part on the quantity of RBs associated with (for example, allocated for) the sidelink feedback transmission and a subcarrier spacing associated with the PSFCH (for example, that is used to transmit the sidelink feedback transmission). Additionally or alternatively, the UE may compensate for sidelink pathloss or downlink pathloss when determining the transmit power for the sidelink feedback transmission. Additionally or alternatively, the UE may apply an offset value, associated with a format used for the sidelink feedback transmission (for example, an offset value that is associated with a PSFCH format used for the sidelink feedback transmission), to the nominal transmit power to determine the transmit power for the sidelink feedback transmission. Additionally or alternatively, the UE may apply a modulation and coding scheme (MCS) offset value, based at least in part on a code rate of the PSFCH, to the nominal transmit power, to determine the transmit power for the sidelink feedback transmission. Additionally or alternatively, the UE may apply one or more closed-loop power control commands to determine the transmit power for the sidelink feedback transmission.

Particular aspects of the subject matter described in this disclosure can be implemented to realize one or more of the following potential advantages. In some examples, the described techniques can be used to improve power control for sidelink feedback transmissions including multi-RB, multi-symbol, or multi-bit sidelink feedback transmissions. Enhancing the power control for sidelink feedback transmissions as described herein may enable a UE to use a multi-RB, a multi-symbol, or a multi-bit sidelink feedback transmission, thereby improving a reliability of the sidelink feedback transmission.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a configuration for sidelink feedback power control; and transmit a sidelink feedback transmission, in accordance with the configuration, using a transmit power that is based at least in part on at least one of: a quantity of resource blocks (RBs) associated with the sidelink feedback transmission, a quantity of symbols associated with the sidelink feedback transmission, a sidelink pathloss value, or a size of the sidelink feedback transmission. Additionally or alternatively, the communication manager 140 may perform one or more other operations described herein.

In some aspects, the base station 110 may include a communication manager 150. As described in more detail elsewhere herein, the communication manager 150 may transmit, to a UE, a configuration for sidelink feedback power control that indicates that the transmit power for sidelink feedback control transmissions is to be based at least in part on at least one of: a quantity of RBs associated with the sidelink feedback transmission, a quantity of symbols associated with the sidelink feedback transmission, a sidelink pathloss value, or a size of the sidelink feedback transmission. Additionally or alternatively, the communication manager 150 may perform one or more other operations described herein.

Figure 2:
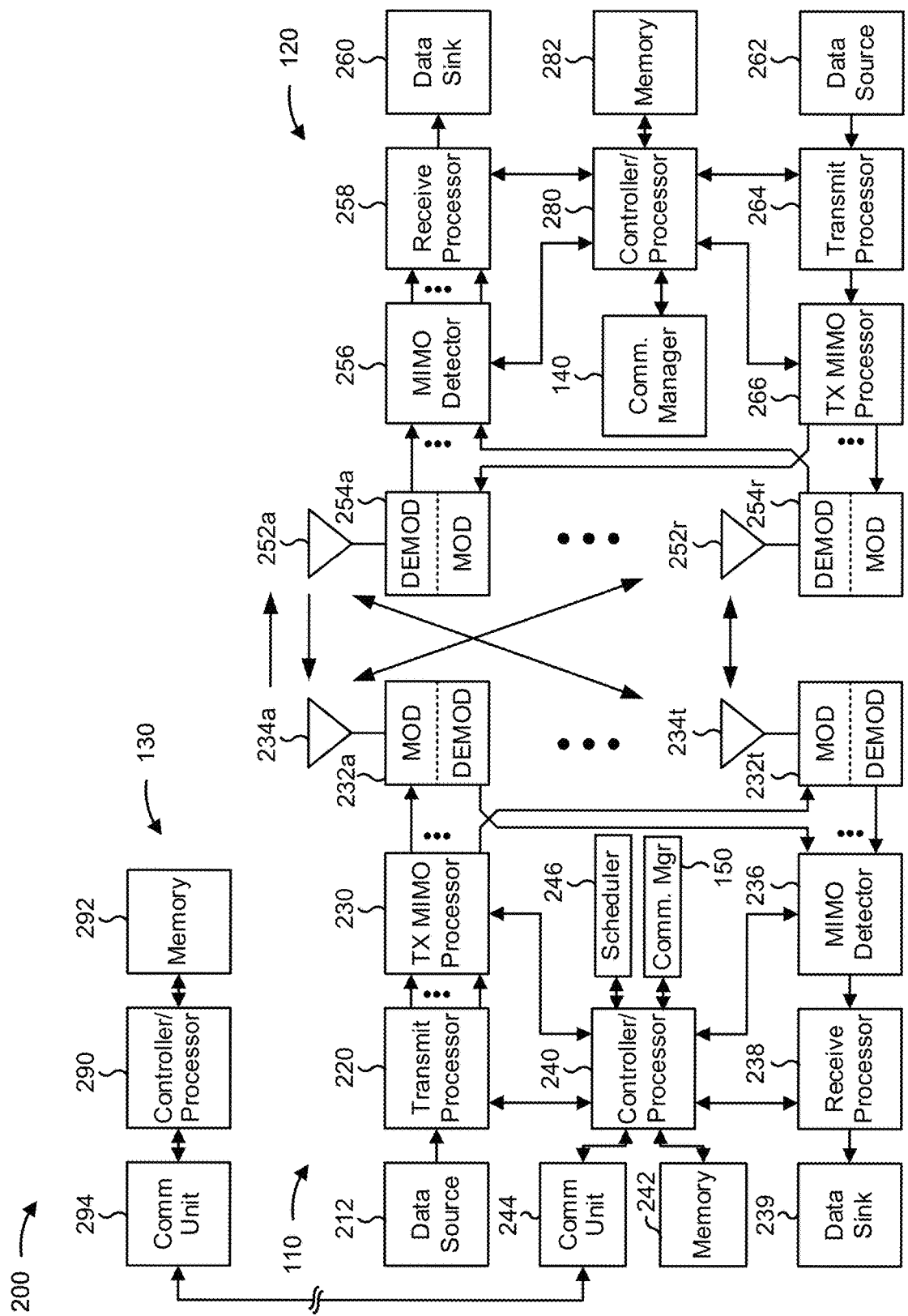
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with power control for sidelink feedback transmissions, as described in more detail elsewhere herein. For example, the controller/processor 240 of the base station 110, the controller/processor 280 of the UE 120, or any other component(s) of FIG. 2 may perform or direct operations of, for example, process 700 of FIG. 7, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 700 of FIG. 7, or other processes as described herein. In some examples, executing instructions may include running the instructions, converting the instructions, compiling the instructions, or interpreting the instructions, among other examples.

In some aspects, the UE 120 includes means for receiving a configuration for sidelink feedback power control; or means for transmitting a sidelink feedback transmission, in accordance with the configuration, using a transmit power that is based at least in part on at least one of: a quantity of RBs associated with the sidelink feedback transmission, a quantity of symbols associated with the sidelink feedback transmission, a sidelink pathloss value, or a size of the sidelink feedback transmission. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 3:
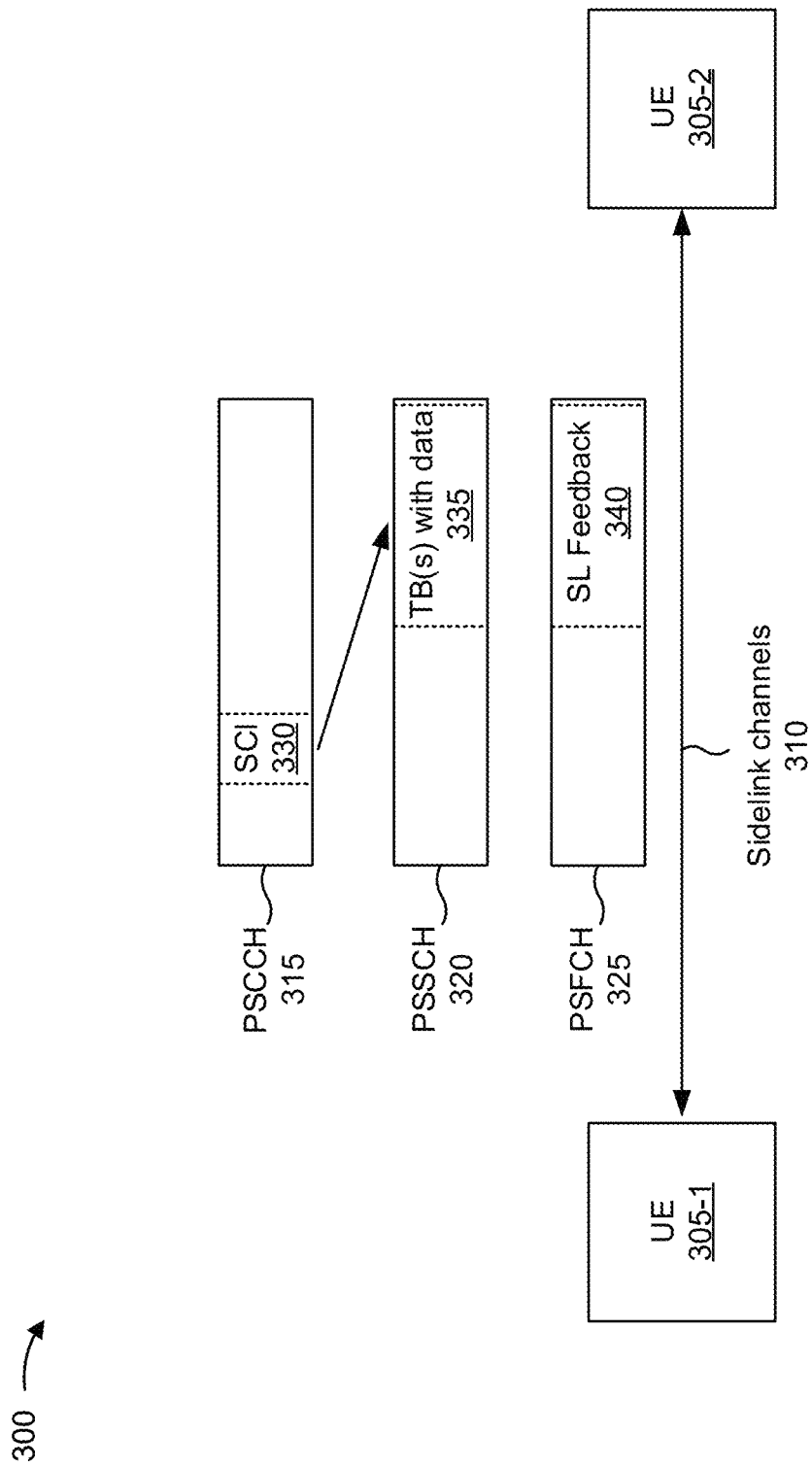
FIG. 3 is a diagram illustrating an example of sidelink communications, in accordance with the present disclosure.

FIG. 3 is a diagram illustrating an example of sidelink communications 300, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (for example, which may include V2V communications, V2I communications, or V2P communications) or mesh networking. In some examples, the UEs 305 (for example, UE 305-1 or UE 305-2) may correspond to one or more other UEs described elsewhere herein, such as UE 120. In some examples, the one or more sidelink channels 310 may use a PC5 interface or may operate in a high frequency band (such as the 5.9 GHz band). Additionally or alternatively, the UEs 305 may synchronize timing of transmission time intervals (TTIs) (for example, frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, or a physical sidelink feedback channel (PSFCH) 325. The PSCCH 315 may be used to communicate control information, similar to a physical downlink control channel (PDCCH) or a physical uplink control channel (PUCCH) used for cellular communications with a base station 110 via an access link or an access channel. The PSSCH 320 may be used to communicate data, similar to a physical downlink shared channel (PDSCH) or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (such as time resources, frequency resources, or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (for example, acknowledgement or negative acknowledgement (ACK/NACK) information), transmit power control (TPC), or a scheduling request (SR).

Although shown on the PSCCH 315, in some examples, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (such as time resources, frequency resources, or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, or a modulation and coding scheme (MCS). The SCI-2 may include information associated with data transmissions on the PSSCH 320, such as a HARQ process ID, a new data indicator (NDI), a source identifier, a destination identifier, or a channel state information (CSI) report trigger.

In some examples, the one or more sidelink channels 310 may use resource pools. For example, a scheduling assignment (for example, included in SCI 330) may be transmitted in sub-channels using specific resource blocks (RBs) across time. In some examples, data transmissions (such as on the PSSCH 320) associated with a scheduling assignment may occupy adjacent RBs in the same subframe as the scheduling assignment (for example, using frequency division multiplexing). In some examples, a scheduling assignment and associated data transmissions are not transmitted on adjacent RBs.

In some examples, a UE 305 may operate using a sidelink transmission mode (which may be referred to herein as "Mode 1") where resource selection or scheduling is performed by a base station 110. For example, the UE 305 may receive a grant (such as in downlink control information (DCI) or in a radio resource control (RRC) message, such as for configured grants) from the base station 110 for sidelink channel access or scheduling. In some examples, a UE 305 may operate using a transmission mode (which may be referred to herein as "Mode 2") where resource selection or scheduling is performed by the UE 305 (for example, rather than a base station 110). In some examples, the UE 305 may perform resource selection or scheduling by sensing channel availability for transmissions. For example, the UE 305 may measure a received signal strength indicator (RSSI) parameter (such as a sidelink-RSSI (S-RSSI) parameter) associated with various sidelink channels, may measure a reference signal received power (RSRP) parameter (for example, a PSSCH-RSRP parameter) associated with various sidelink channels, or may measure a reference signal received quality (RSRQ) parameter (for example, a PSSCH-RSRQ parameter) associated with various sidelink channels, and may select a channel for transmission of a sidelink communication based at least in part on the measurement(s).

Additionally or alternatively, the UE 305 may perform resource selection or scheduling using SCI 330 received in the PSCCH 315, which may indicate occupied resources or channel parameters. Additionally or alternatively, the UE 305 may perform resource selection or scheduling by determining a channel busy rate (CBR) associated with various sidelink channels, which may be used for rate control (for example, by indicating a maximum quantity of resource blocks that the UE 305 can use for a particular set of subframes).

In the transmission mode where resource selection or scheduling is performed by a UE 305 (for example, Mode 2), the UE 305 may generate sidelink grants, and may transmit the grants in SCI 330. A sidelink grant may indicate, for example, one or more parameters (for example, transmission parameters) to be used for an upcoming sidelink transmission, such as one or more resource blocks to be used for the upcoming sidelink transmission on the PSSCH 320 (for example, for TBs 335), one or more subframes to be used for the upcoming sidelink transmission, or an MCS to be used for the upcoming sidelink transmission. In some examples, a UE 305 may generate a sidelink grant that indicates one or more parameters for semi-persistent scheduling (SPS), such as a periodicity of a sidelink transmission. Additionally or alternatively, the UE 305 may generate a sidelink grant for event-driven scheduling, such as for an on-demand sidelink message.

Figure 4:
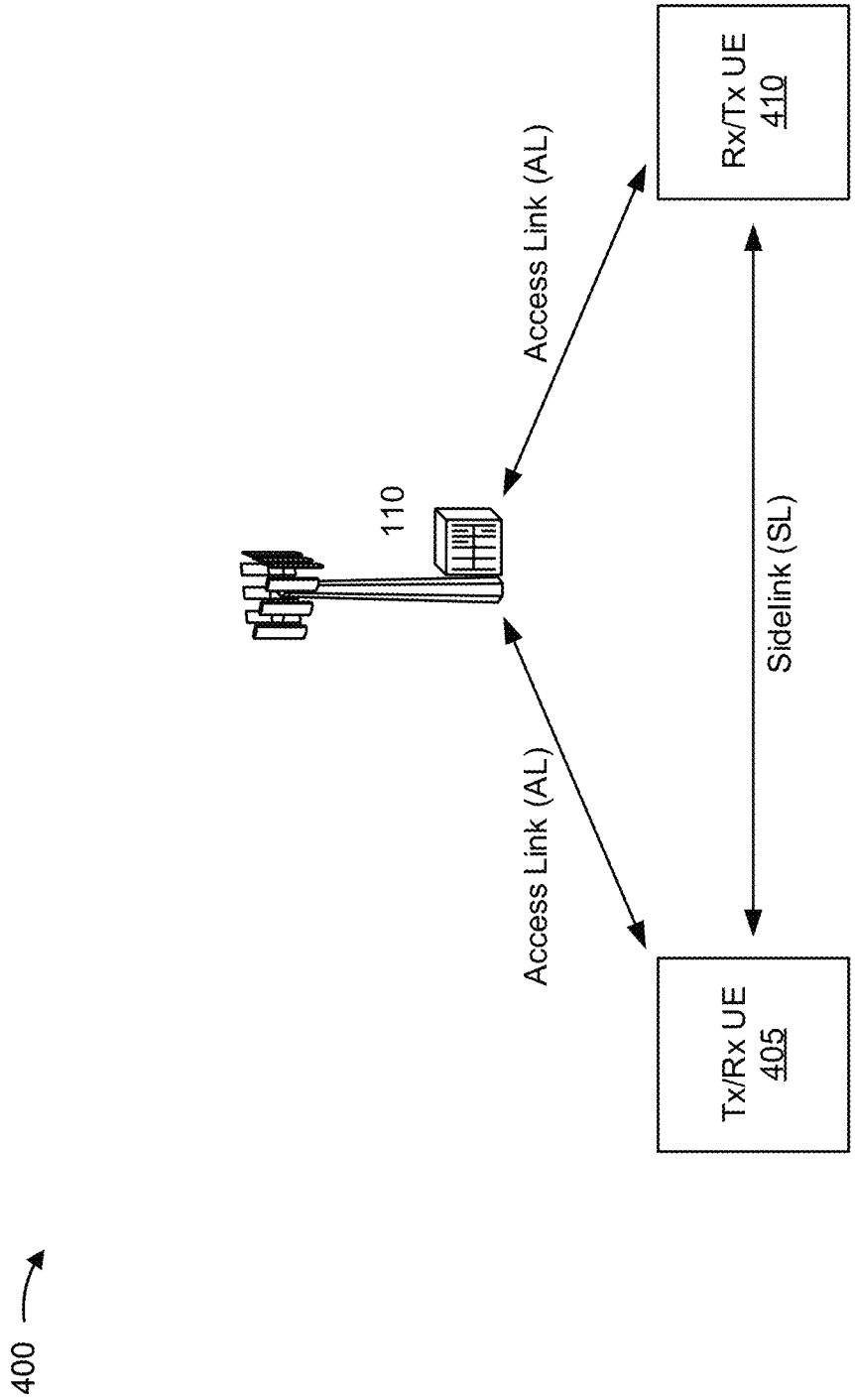
FIG. 4 is a diagram illustrating an example of sidelink communications and access link communications, in accordance with the present disclosure.

FIG. 4 is a diagram illustrating an example of sidelink communications and access link communications 400, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally or alternatively, in some sidelink modes, the base station 110 may communicate with the Rx/Tx UE 410 via a second access link. The Tx/Rx UE 405 or the Rx/Tx UE 410 may correspond to one or more UEs described elsewhere herein, such as the UE 120 of FIG. 1.

Thus, a direct link between UEs 120 (for example, via a PC5 interface) may be referred to as a sidelink, and a direct link between a base station 110 and a UE 120 (for example, via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

Figure 5:
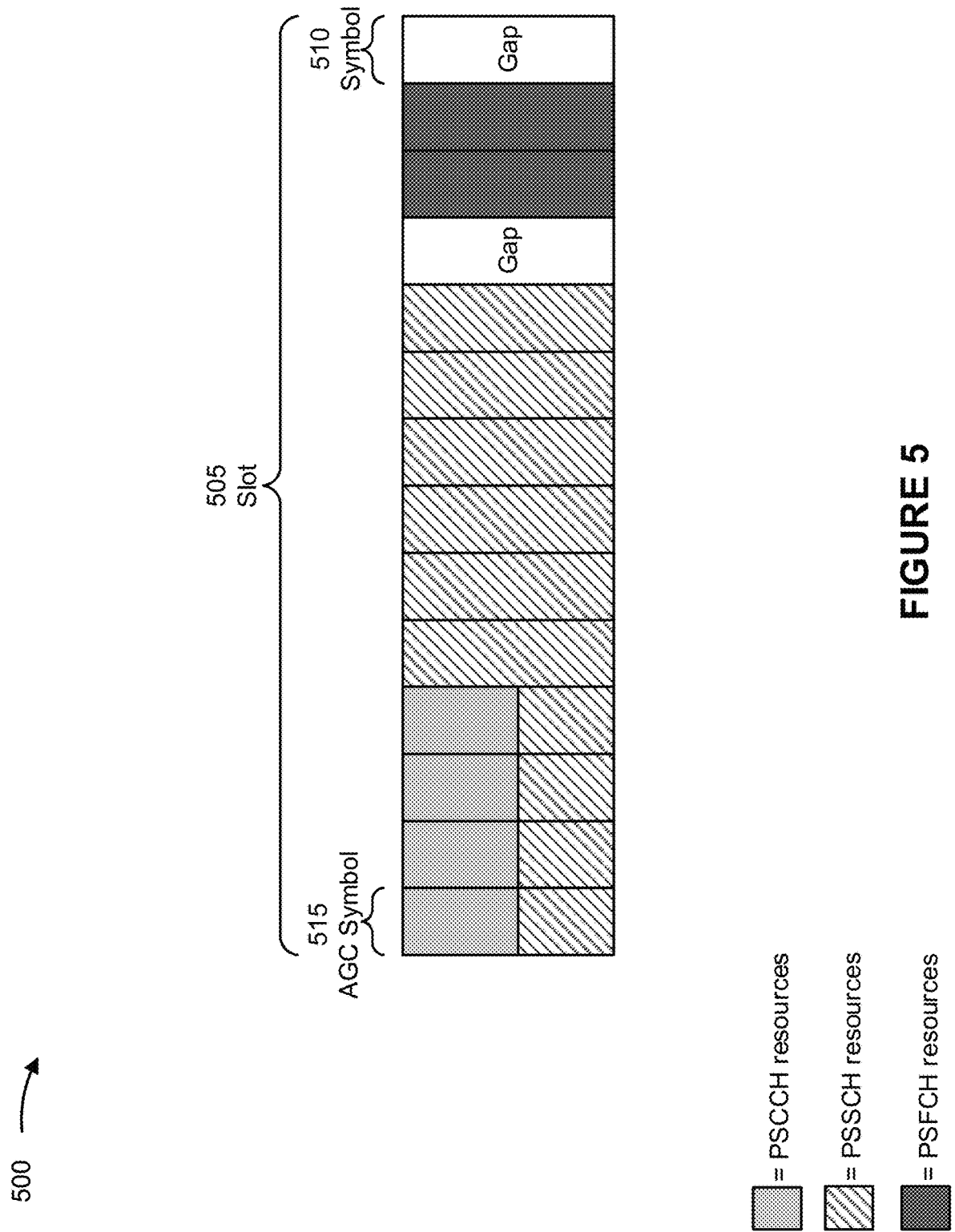
FIG. 5 is a diagram illustrating an example of a sidelink slot format that includes physical sidelink feedback channel (PSFCH) resources, in accordance with the present disclosure.

FIG. 5 is a diagram illustrating an example of a sidelink slot format 500 that includes PSFCH resources, in accordance with the present disclosure. As shown in FIG. 5, a slot 505 may include multiple symbols 510 (for example, 14 symbols 510 as shown in FIG. 5). The slot 505 may include a set of time-frequency resources (such as resource elements (REs)) that are associated with, or reserved for, transmissions via the PSCCH. Additionally, the slot 505 may include a set of time-frequency resources (such as REs) that are associated with, or reserved for, transmissions via the PSSCH. Further, the slot 505 may include a set of time-frequency resources (such as REs) that are associated with, or reserved for, transmissions via the PSFCH.

In other words, a PSCCH, a PSSCH, and a PSFCH may be transmitted within a same slot. The PSCCH may occupy up to one subchannel with a lowest subchannel index. SCI-1 may be transmitted in the PSCCH and may indicate information regarding a PSSCH bandwidth and resource reservations in upcoming slots. The PSCCH may be configured (or preconfigured) to occupy 10, 12, 15, 20, or 25 physical resource blocks (PRBs), and may be limited to one subchannel, where each sub-channel may occupy 10, 15, 20, 25, 50, 75, or 100 PRBs. A PSCCH duration may be configured (or preconfigured) to two or three symbols. A PSCCH size may be fixed for a resource pool. The PSSCH may occupy up to $N_{subchannel}^{SL}$ contiguous subchannels. SCI-2 may be decoded after decoding the PSCCH. In other words, the PSSCH may occupy at least one subchannel and may contain the SCI-2.

As shown in FIG. 5, at least one symbol 510 in the slot 505 may be an automatic gain control (AGC) symbol 515. For example, to compensate for a power variability of sidelink signals, a UE may perform an AGC operation on a signal in a first one or more symbols 510 of each slot 505 in order to adjust the power of the signal to a suitable amplitude. Accordingly, when performing a demodulation operation on the signal, the UE may drop the AGC symbol 515 if an AGC operation was performed on the signal in the AGC symbol 515.

As explained in more detail elsewhere herein, a UE may transmit or receive HARQ feedback via the PSFCH (such as the PSFCH 325). The PSFCH may be configured, or enabled, for unicast transmissions (for example, for one-to-one communications) or for groupcast transmissions (for example, for one-to-many communications). A PSFCH transmission may include one bit indicating ACK feedback or NACK feedback. For groupcast transmissions, in some cases, a PSFCH transmission may be associated with NACK feedback (for example, a UE may transmit the PSFCH transmission to indicate NACK feedback and may not transmit the PSFCH transmission to indicate ACK feedback). Alternatively, for groupcast transmissions, a PSFCH transmission may be associated with ACK feedback and NACK feedback. A PSFCH transmission may indicate HARQ feedback (for example, ACK/NACK feedback) for a transmission that is received K slots prior to the transmission of the PSFCH transmission (for example, K slots prior to the slot 505). A value for K may be configured for a UE and may be 2, 3, or another quantity of slots.

A PSFCH transmission may use a format. The format may be based at least in part on (or may be the same as) a PUCCH format (for example, as defined, or otherwise fixed, by a wireless communication standard, such as the 3GPP). For example, a PSFCH transmission may use a PUCCH format 0 (for example, as defined, or otherwise fixed, by a wireless communication standard, such as the 3GPP). In some cases, only a single format (for example, the PUCCH format 0) may be defined for the PSFCH.

A UE may receive (such as from a base station or another control entity) a PSFCH configuration. The PSFCH configuration may be associated with, or included in, a sidelink resource pool configuration. The PSFCH configuration may indicate a periodicity associated with the PSFCH. The periodicity may indicate how often, in terms of a quantity of slots, resources are to be reserved for the PSFCH. For example, the periodicity may be associated with values of 0 (for example, indicating that the PSFCH is disabled or not configured), 1 (for example, indicating that each slot includes resources reserved for the PSFCH), 2 (for example, indicating that every other slot includes resources reserved for the PSFCH), 4 (for example, indicating that every $4^{th}$ slot includes resources reserved for the PSFCH), or another value. The PSFCH configuration may indicate a time gap (for example, a minimum time gap) between the resources reserved for the PSFCH and an associated PSSCH reception (for example, the resources reserved for the PSFCH may be used by the UE to transmit ACK/NACK feedback for the associated PSSCH reception). The time gap may be defined in terms of a quantity of slots, such as 2 slots, 3 slots, or another quantity of slots.

The PSFCH configuration may indicate a quantity of multiplexing cyclic shifts. For example, because the PSFCH may re-use the PUCCH format 0, the PSFCH may be associated with 2 base sequences with one or more allowed cyclic shifts (for example, to mitigate a risk of a collision or interference with a PSFCH transmission from another UE using the same time-frequency resources). The PSFCH configuration may indicate resources reserved for the PSFCH. For example, a configuration parameter (such as an rbSetPSFCH parameter, as defined, or otherwise fixed, by a wireless communication standard) may indicate a set of PRBs that are reserved for the PSFCH (for example, a set of PRBs, from a resource pool, for PSFCH transmission).

For example, the PSFCH may be mapped to one RB. The configuration parameter (such as the rbSetPSFCH parameter) may provide the set of PRBs available for the PSFCH in the resource pool. A UE may identify candidate RBs for the PSFCH for a subchannel, j, and a slot, i. The UE may allocate the $[(i+j \cdot N_{PSFCH}) \cdot M_{subslot}]$ to $[(i+1 \cdot jN_{PSFCH}) \cdot M_{Subc,slot} - 1]$ RBs for the PSFCH. $N_{PSFCH}$ may be a quantity of slots associated with the PSFCH (for example, indicated by the periodicity associated with the PSFCH). $M_{Subc,slot}$ may be a quantity of the RBs, defined by $$M_{Subc,slot} = \frac{\text{\# of } RBS \text{ allocated for the } PSFCH \text{(by the } rbSetPSFCH \text{ parameter)}}{\text{(value for the periodicity of the } PSFCH \cdot \text{ a quantity of subchannels associated with the } PSFCH\text{)}}.$$

For example, if $N_{PSFCH}$ is 2 and $M_{Subc,slot}$ is 5, and j is 0, then RBs [0 to 4] for i=0 and RBs [5 to 9] for i=1 may be reserved for the PSFCH by the UE. The UE may determine resources for multiplexing the PSFCH as $R = N_{type} \cdot M_{Subc,slot} \cdot \#CS$, where $N_{type}$ is a value configured for the PSFCH associated with a starting subchannel of the PSFCH, and where #CS is the configured quantity of the cyclic shift for the PSFCH. The UE may select an RB, from the RBs reserved for the PSFCH in accordance with $(P_{ID}+M_{ID}) \mod R$, where $P_{ID}$ is an identifier of the transmitter (for example, of the UE), and where $M_{ID}$ is a receiver identifier for groupcast transmissions (if not a groupcast, $M_{ID}=0$).

A PSFCH transmission may be duplicated in a preceding symbol. For example, as shown in FIG. 5, two symbols 510 may be allocated for the PSFCH. The second symbol 510 may include the RB selected by the UE for the PSFCH transmission and the first symbol 510 may include a duplicated (for example, identical) version of the PSFCH transmission. For example, the first symbol may be used for AGC operations by a receiver. In other words, the PSFCH transmission may be associated with a single RB in a single symbol, where the information carried in the single symbol is duplicated across 2 symbols.

The PSFCH transmission may be based at least in part on a Zadoff-Chu sequence. The Zadoff-Chu sequence may be generated based at least in part on a group and a sequence number. The group may be indicated by a configuration parameter that is associated with a PSFCH hopping (for example, frequency hopping) configuration, such as an sl-PSFCH-HopID-r16 parameter. In some examples, the PSFCH may be associated with cyclic shift hopping or frequency hopping. For example, the PSFCH may apply cyclic shift hopping in accordance with the equation $$\frac{2\pi}{12}((m_0 + m_{cs} + n_{cs}(n_{s,f}^\mu, l + l')) \mod 12),$$

where $m_0$ is based at least in part on a PSFCH configuration of supported cyclic shift pairs, $m_{CS}$ is based at least in part on a value of ACK/NACK and a HARQ mode associated with the PSFCH transmission, and $n_{CS}$ ($n_{s,f}^\mu$,l+l') is a function that is based at least in part on a slot number and a symbol index of the PSFCH.

A UE may determine a transmit power for a PSFCH transmission using open-loop power control or closed-loop power control. For example, the UE may determine a transmit power for a PSFCH transmission based at least in part on a nominal transmit power level (for example, that is configured for the PSFCH or for a resource pool associated with the PSFCH), a scaling factor that is based at least in part on the subcarrier spacing that is configured for the resource pool associated with the PSFCH, or a downlink pathloss value, among other examples. For example, the UE may determine a transmit power for a PSFCH transmission using the equation $P_{O,PSFCH} + 10 \log_{10}(2^\mu) + \alpha_{PSFCH} \cdot PL$, where $P_{O,PSFCH}$ is the nominal transmit power level, $10 \log_{10}(2^\mu)$ is the scaling factor that is based at least in part on the subcarrier spacing ($\mu$), and $\alpha_{PSFCH} \cdot PL$ is a compensation value for the downlink pathloss (for example, where $\alpha_{PSFCH}$ is a pathloss offset (for example, a fractional pathloss parameter) open-loop power control parameter (alpha or a) configured for the PSFCH and PL is the downlink pathloss measured via a reference signal). For example, the transmit power for a PSFCH transmission may compensate for downlink pathloss to mitigate a risk of interference caused by the PSFCH transmission to a Uu interface or an access link with a base station. In some examples, where the UE is transmitting multiple PSFCH transmissions simultaneously, a maximum transmit power of the UE may be split (for example, equally) among all of the multiple PSFCH transmissions.

However, because a PSFCH transmission may include only a single bit of information and may occupy only a single RB, the PSFCH transmission may have a poor reliability. For example, a feedback channel may be designed for high reliability. This is because a NACK-to-ACK error (for example, where a NACK feedback message is incorrectly interpreted as ACK feedback by a receiver) may result in a missed packet and an ACK-to-NACK error (for example, where an ACK feedback message is incorrectly interpreted as NACK feedback by a receiver) may result in unnecessary retransmissions. The single bit, single RB PSFCH transmissions may have an insufficient reliability for some sidelink applications, such as an industrial Internet of Things (IIoT) application. Therefore, a PSFCH format may be used by the UE to transmit a PSFCH transmission where the PSFCH transmission occupies multiple RBs (for example, in the frequency domain) or multiple symbols (for example, in the time domain) to improve a reliability of the PSFCH transmission. Additionally or alternatively, a size of the PSFCH transmission may be increased (for example, to larger than 1 bit) to carry additional information, such as multiple HARQ feedback messages, CSI, or inter-UE coordination messages, among other examples. However, as described above, a transmit power control for the PSFCH may use only a nominal transmit power, a scaling factor that is based at least in part on the subcarrier spacing, and an offset value for downlink pathloss to determine a transmit power for a PSFCH transmission. For a multi-RB, multi-symbol, or multi-bit PSFCH transmission, using a transmit power control that only considers the nominal transmit power, the scaling factor that is based at least in part on the subcarrier spacing, and the offset value for downlink pathloss to determine a transmit power for the PSFCH transmission may result in a poor transmit power determination. For example, using a transmit power control that only considers the nominal transmit power, the scaling factor that is based at least in part on the subcarrier spacing, and the offset value for downlink pathloss to determine a transmit power for the PSFCH transmission may result in reliability for the PSFCH transmission varying based at least in part on a size of the PSFCH transmission.

Various aspects relate generally to enhanced power control for sidelink feedback transmissions. Some aspects more specifically relate to transmit power control for sidelink feedback transmissions that span multiple RBs, span multiple symbols, or include multiple bits. In some aspects, a UE may transmit a sidelink feedback transmission (for example, a PSFCH transmission), using a transmit power that is based at least in part on a quantity of RBs associated with the sidelink feedback transmission, a quantity of symbols associated with the sidelink feedback transmission, a sidelink pathloss value, or a size of the sidelink feedback transmission. In some aspects, the UE may receive a configuration associated with power control for the PSFCH (for example, that is used to transmit the sidelink feedback transmission).

In some aspects, the UE may adjust the transmit power (for example, adjust the nominal transmit power for sidelink transmissions) based at least in part on the quantity of RBs associated with (for example, allocated for) the sidelink feedback transmission and a subcarrier spacing associated with the PSFCH (for example, that is used to transmit the sidelink feedback transmission). Additionally or alternatively, the UE may compensate for sidelink pathloss or downlink pathloss when determining the transmit power for the sidelink feedback transmission. Additionally or alternatively, the UE may apply an offset value, associated with a format used for the sidelink feedback transmission (for example, an offset value that is associated with a PSFCH format used for the sidelink feedback transmission), to the nominal transmit power to determine the transmit power for the sidelink feedback transmission. Additionally or alternatively, the UE may apply an MCS offset value, based at least in part on a code rate of the PSFCH, to the nominal transmit power, to determine the transmit power for the sidelink feedback transmission. Additionally or alternatively, the UE may apply one or more closed-loop power control commands to determine the transmit power for the sidelink feedback transmission.

Particular aspects of the subject matter described in this disclosure can be implemented to realize one or more of the following potential advantages. In some examples, the described techniques can be used to improve power control for sidelink feedback transmissions including multi-RB, multi-symbol, or multi-bit sidelink feedback transmissions. Enhancing the power control for sidelink feedback transmissions as described herein may enable a UE to use a multi-RB, a multi-symbol, or a multi-bit sidelink feedback transmission, thereby improving a reliability of the sidelink feedback transmission.

Figure 6:
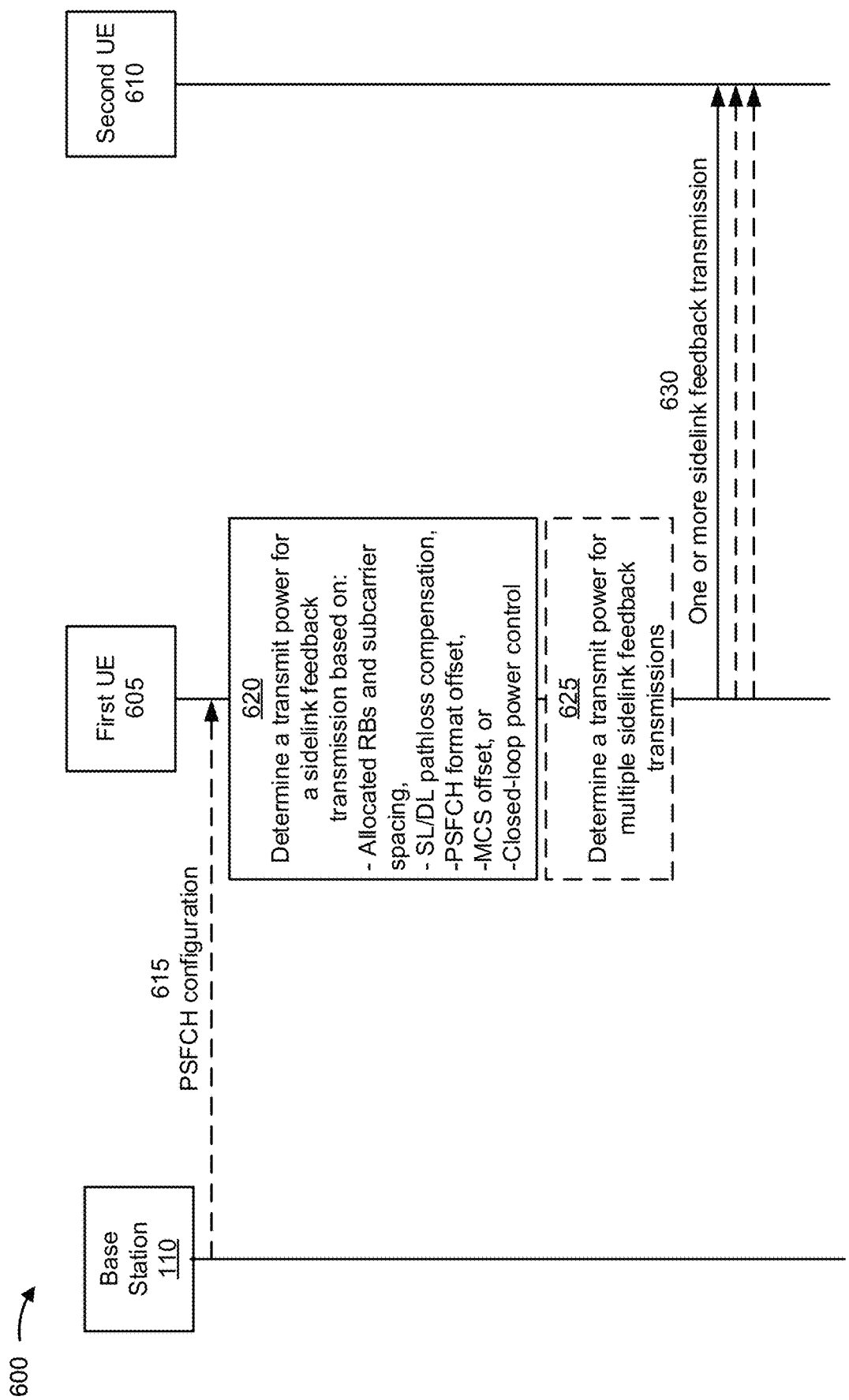
FIG. 6 is a diagram illustrating an example associated with transmit power control for sidelink feedback transmissions, in accordance with the present disclosure.

FIG. 6 is a diagram illustrating an example associated with transmit power control 600 for sidelink feedback transmissions, in accordance with the present disclosure. As shown in FIG. 6, a base station 110, a first UE 605, and a second UE 610 may communicate with one another in a wireless network, such as the wireless network 100. For example, the base station 110 may communicate with the first UE 605 or the second UE 610 via an access link. The first UE 605 and the second UE 610 may communicate via a sidelink.

In a first operation 615, in some aspects, the first UE 605 may receive configuration information. For example, the base station 110 may transmit, and the first UE 605 may receive, the configuration information. In some aspects, the first UE 605 may receive the configuration information from another device, such as a different base station, a roadside unit (RSU), or another UE, among other examples. The first UE 605 may receive the configuration information via an RRC message, a medium access control (MAC) control element (MAC-CE) message, or another message.

The configuration information may be a PSFCH configuration. For example, the configuration information may indicate one or more configuration parameters for the PSFCH. In some aspects, the configuration information may be associated with a sidelink resource pool configuration. In some aspects, the configuration information may indicate a configuration for sidelink feedback power control. For example, the configuration information may indicate that the first UE 605 is to perform power control for the PSFCH as described in more detail elsewhere herein. For example, the configuration for sidelink feedback power control may be associated with multi-RB, multi-symbol, or multi-bit PSFCH messages. In some aspects, the configuration for sidelink feedback power control may be associated with one or more PSFCH formats that are associated with multi-RB, multi-symbol, or multi-bit PSFCH messages. For example, one or more PSFCH formats may be defined (for example, by a wireless communication standard, such as the 3GPP) that indicate that a PSFCH transmission, that use the one or more PSFCH formats, include multiple RBs, multiple symbols, or have a payload size larger than 1 bit, among other examples. The configuration for sidelink feedback power control may be associated with the one or more PSFCH formats.

In some aspects, the first UE 605 may transmit, and the base station 110 may receive, an indication of a capability of the first UE 605 to perform power control for the PSFCH, as described in more detail elsewhere herein. For example, the first UE 605 may indicate a capability to communicate using multi-RB, multi-symbol, or multi-bit PSFCH messages. In some aspects, the first UE 605 may indicate a capability to communicate using a PSFCH format that is associated with multiple RBs, multiple symbols, or a payload size larger than 1 bit, among other examples. The first UE 605 may transmit the indication of the capability via an RRC message, a MAC-CE message, a UE capability message, or a PUCCH message, among other examples.

In a second operation 620, the first UE 605 may determine a transmit power, $P_{PSFCH}$, for a sidelink feedback transmission. "Sidelink feedback transmission" may be used interchangeably herein with "PSFCH transmission." The first UE 605 may be triggered to transmit the sidelink feedback transmission. In some aspects, the first UE 605 may be triggered to transmit the sidelink feedback transmission based at least in part on receiving a sidelink communication (for example, where the sidelink feedback transmission indicates HARQ feedback for the sidelink communication). In some other aspects, the first UE 605 may be triggered to transmit the sidelink feedback transmission based at least in part on receiving a message from the base station 110 or another device via a Uu interface or an access link. As another example, the first UE 605 may be triggered to transmit the sidelink feedback transmission based at least in part on detecting an event. The event may be associated with detecting a collision (for example, interference) on a sidelink channel or an access link channel. As another example, the event may be associated with the expiration of a timer (for example, a timer that is configured as part of the PSFCH configuration). The first UE 605 may determine to transmit the sidelink feedback transmission based at least in part on one or more of the operations described above.

In some aspects, the first UE 605 may determine that the sidelink feedback transmission is associated with multiple RBs, multiple symbols, or multiple bits (for example, based at least in part on the PSFCH configuration). For example, the first UE 605 may determine that the sidelink feedback transmission is to use a PSFCH format that is associated with multiple RBs, multiple symbols, or multiple bits. For example, the PSFCH format may be similar to a PUCCH format 1, a PUCCH format 2, a PUCCH format 3, or a PUCCH format 4, among other examples (for example, as defined, or otherwise fixed, by a wireless communication standard, such as the 3GPP).

In some aspects, the first UE 605 may determine that multiple sidelink feedback transmissions are to be transmitted simultaneously by the first UE 605. As used herein, "simultaneously" or "simultaneous" may refer to at least partially overlapping in the time domain. For example, the first UE 605 may determine that multiple sidelink feedback transmissions are to be transmitted in the same slot, the same symbol, or the same TTI, among other examples. In some aspects, the capability message transmitted by the first UE 605 may indicate a quantity of simultaneous PSFCH transmissions supported by the first UE 605. In some aspects, the capability message transmitted by the first UE 605 may indicate a quantity of simultaneous PSFCH transmissions that can be supported by the first UE 605 for each PSFCH format or for different combinations of PSFCH formats. The power control and transmission of multiple simultaneous PSFCH transmissions is described in more detail elsewhere herein.

In some aspects, the sidelink feedback transmission may be associated with a size (for example, in terms of a quantity of bits). For example, the sidelink feedback transmission may include L bits. In some aspects, the size may be larger than a single bit (for example, may be multiple bits). The size of the sidelink feedback transmission is based at least in part on a size of information associated with sidelink HARQ feedback (for example, one or more HARQ feedback indications), a scheduling request, a CSI report, or one or more inter-UE coordination messages, among other examples. An inter-UE coordination message may be associated with a first UE (for example, the first UE 605) indicating a set of available resources to a second UE (for example, the second UE 610). In some aspects, the first UE 605 may transmit the indication of the set of available resources while operating in sidelink resource allocation mode 2. In some aspects, the indication of the set of available resources may identify resources that are preferred by the first UE 605 for transmissions by the second UE 610. Alternatively, the indication of the set of available resources may identify resources that are not preferred by the first UE 605 for transmissions by the second UE 610 (for example, with the available resources being those other than the resources that are not preferred). Additionally or alternatively, the inter-UE coordination signaling may indicate a resource conflict (for example, a collision), such as when two UEs have reserved the same resource (for example, and were unable to detect this conflict because the two UEs transmitted a resource reservation message on the same resource and thus did not receive one another's resource reservation messages due to a half-duplex constraint). For example, the sidelink feedback transmission may include a pre-collision inter-UE coordination message or a post-collision inter-UE coordination message.

The sidelink feedback transmission may be associated with a quantity of RBs. The quantity of RBs may be represented herein by M For example, the quantity of RBs may be a quantity of RBs allocated for the sidelink feedback message (for example, based at least in part on the PSFCH format associated with the sidelink feedback message). In some aspects, the quantity of RBs may be greater than 1 (for example, the sidelink feedback message may be associated with multiple RBs). The sidelink feedback transmission may be associated with a quantity of symbols. The quantity of symbols may be represented herein by N. In some aspects, the quantity of symbols associated with the sidelink feedback transmission does not include any symbols associated with AGC operations associated with the sidelink feedback transmission. For example, the quantity of symbols, N, may exclude any symbols that are duplicated for AGC operations. Alternatively, the quantity of symbols may include any symbols that are duplicated for AGC operations. In some aspects, the quantity of symbols may be larger than 1 (for example, the sidelink feedback transmission may be associated with multiple symbols).

In some aspects, a nominal transmit power for sidelink feedback transmissions ($P_{0,PSFCH}$) may be defined (for example, by the base station 110 or by a wireless communication standard). For example, the configuration information (such as the PSFCH configuration) may indicate the nominal transmit power for sidelink feedback transmissions. In other words, the first UE 605 may receive, from the base station 110 (or another device), an indication of the nominal transmit power. The nominal transmit power may be a starting point, or an initial transmit power before adjustments (for example, open-loop power control adjustments) are made by the first UE 605, as described herein. The nominal transmit power may be associated with a bandwidth part (BWP) associated with the sidelink feedback transmission, a sidelink resource pool associated with the sidelink feedback transmission, or a serving cell associated with the first UE 605, among other examples. For example, the nominal transmit power may be configured for the sidelink BWP that is to be used by the first UE 605 to transmit the sidelink feedback transmission. As another example, the nominal transmit power may be configured for the sidelink resource pool that is to be used by the first UE 605 to transmit the sidelink feedback transmission. Additionally or alternatively, the nominal transmit power may be associated with a serving cell (for example, associated with the base station 110) of the first UE 605. In some aspects, the nominal transmit power may be configured for a carrier frequency that is associated with an access link between the first UE 605 and the serving cell (or that is to be used by the first UE 605 to transmit the sidelink feedback transmission).

In some aspects, the nominal transmit power, $P_{0,PSFCH}$, may comprise multiple parts or components. For example, the nominal transmit power may be based at least in part on a first nominal transmit power, $P_{0,NOMINAL\_PSFCH}$, that is associated with a cell or a sidelink resource pool. For example, the first nominal transmit power may be a cell-specific power level (for example, specific to a given cell or base station) for Mode 1 communications. As another example, for Mode 2 communications, the first nominal transmit power level may be a resource-pool-specific power level (for example, specific to a given sidelink resource pool). Additionally, the nominal transmit power may be based at least in part on a second nominal transmit power, $P_{0,UE\_PSFCH}$, that is associated with the first UE 605. The second nominal transmit power may be a UE-specific offset value for the nominal transmit power for sidelink feedback transmissions. For example, the second nominal transmit power may be specific to the first UE 605. In some aspects, the second nominal transmit power may be based at least in part on a capability of the first UE 605. For example, the second nominal transmit power may be configured (for example, by the base station 110) in accordance with a performance or capability of the first UE 605. Therefore, the nominal transmit power may be defined as $P_{0,PSFCH} = P_{0,NOMINAL\_PSFCH} + P_{0,UE\_PSFCH}$.

In some aspects, the transmit power for the sidelink feedback transmission may be based at least in part on the nominal transmit power, the quantity of RBs associated with the sidelink feedback transmission, and a subcarrier spacing, $\mu$, associated with the sidelink feedback transmission. For example, the first UE 605 may adjust the transmit power for the sidelink feedback transmission in accordance with the quantity of RBs allocated for the sidelink feedback transmission and the subcarrier spacing to be used to transmit for the sidelink feedback transmission. For example, the transmit power for the sidelink feedback transmission may be defined as $P_{PSFCH} = P_{0,PSFCH} + 10 \log(2^\mu M)$.

In some aspects, the transmit power for the sidelink feedback transmission may be based at least in part on pathloss offset value, PL. The pathloss offset value may be based at least one of a sidelink pathloss value or a downlink pathloss value. For example, the transmit power for the sidelink feedback transmission may be defined as $P_{PSFCH} = P_{0,PSFCH} + 10 \log(2^\mu M) + PL$. In some aspects, whether the pathloss offset value is based at least in part on the sidelink pathloss value, the downlink pathloss value, or both, may be based at least in part on open-loop power control parameters configured for the first UE 605 (for example, by the base station 110). For example, the first UE 605 may receive an indication of an open-loop power control parameter associated with sidelink pathloss compensation for a physical sidelink feedback channel. The open-loop power control parameter may be a pathloss offset parameter, alpha. For example, the first UE 605 may be configured with an alpha_PSFCH_SL_PL parameter. In such examples, the pathloss offset value may be based at least in part on the sidelink pathloss value because the open-loop power control parameter, alpha, that is associated with sidelink pathloss is configured for the first UE 605. In other words, the transmit power may be based at least in part on the sidelink pathloss value based at least in part on receiving the indication of the open loop power control parameter associated with sidelink pathloss compensation. For example, the first UE 605 may determine the sidelink pathloss value using the open-loop power control parameter, alpha, that is associated with sidelink pathloss. For example, the first UE 605 may measure a reference signal that is configured for sidelink pathloss measurements, such as a DMRS that is included in SCI or a PSSCH message. The first UE 605 may use the open-loop power control parameter, alpha, that is associated with sidelink pathloss and the measurement of the reference signal to determine the sidelink pathloss value.

As another example, the first UE 605 may receive an indication of an open loop power control parameter associated with downlink pathloss compensation. For example, the first UE 605 may be configured with an alpha_PSFCH_DL_PL parameter. In such examples, the pathloss offset value may be based at least in part on the downlink pathloss value because the open-loop power control parameter, alpha, that is associated with downlink pathloss is configured for the first UE 605. In other words, the transmit power may be based at least in part on the downlink pathloss value based at least in part on receiving the indication of the open loop power control parameter associated with downlink pathloss compensation. For example, the first UE 605 may determine the downlink pathloss value using the open-loop power control parameter, alpha, that is associated with downlink pathloss. For example, the first UE 605 may measure a reference signal that is configured for downlink pathloss measurements, such as a synchronization signal block (SSB) or a channel state information reference signal (CSI-RS) that is transmitted by the base station 110. The first UE 605 may use the open-loop power control parameter, alpha, that is associated with downlink pathloss and the measurement of the reference signal to determine the downlink pathloss value.

In some aspects, the pathloss offset value may be based at least in part on a comparison of the sidelink pathloss value to the downlink pathloss value. In other words, the transmit power may be based at least in part on one of (or a combination of) the sidelink pathloss value or the downlink pathloss value based at least in part on the comparison of the sidelink pathloss value to the downlink pathloss value. For example, the first UE 605 may be configured (for example, via the configuration information) to use a lesser value (for example, a minimum) of the sidelink pathloss value or the downlink pathloss value for the pathloss offset value. For example, the pathloss offset value may be $PL = \min(alpha_{SL}, alpha_{DL}) \times \min(\text{sidelink PL}, \text{downlink PL})$ or $PL = \max(alpha_{SL}, alpha_{DL}) \times \min(\text{sidelink PL}, \text{downlink PL})$, where $alpha_{SL}$ is an alpha parameter associated with the sidelink channel and $alpha_{DL}$, is an alpha parameter associated with the downlink channel. Using the lesser value (for example, the minimum) of the sidelink pathloss value or the downlink pathloss value for the pathloss offset value may improve interference control for an access link (for example, may improve interference control for the base station 110). Alternatively, the first UE 605 may be configured (for example, via the configuration information) to use a greater value (for example, a maximum) of the sidelink pathloss value or the downlink pathloss value for the pathloss offset value. For example, the pathloss offset value may be $PL = \min(alpha_{SL}, alpha_{DL}) \times \max(\text{sidelink PL}, \text{downlink PL})$ or $PL = \max(alpha_{SL}, alpha_{DL}) \times \max(\text{sidelink PL}, \text{downlink PL})$. Using the greater value (for example, the maximum) of the sidelink pathloss value or the downlink pathloss value for the pathloss offset value may improve interference control for the first UE 605 associated with providing feedback to another UE and the base station 110.

In some aspects, if the first UE 605 is not configured with either the open loop power control parameter associated with downlink pathloss compensation or the open-loop power control parameter associated with sidelink pathloss compensation for a physical sidelink feedback channel, then the first UE 605 may not apply the pathloss offset value when determining the transmit power for the sidelink feedback transmission. In such examples, a value of the pathloss offset value, PL, may be set to 0.

In some aspects, the transmit power for the sidelink feedback transmission may be based at least in part on a power offset value, $\Delta_{F\_PSFCH}$, that is based at least in part on a PSFCH format used for the sidelink feedback transmission. For example, as described elsewhere herein, the sidelink feedback transmission may use a PSFCH format. The PSFCH format may be associated with the power offset value. The configuration information may indicate different power offset values for different PSFCH formats (for example, each PSFCH format available to be used by the first UE 605 may be associated with a separate power offset value). A power offset value for a PSFCH format may account for a performance or a reliability associated with the PSFCH format. For example, different PSFCH formats may be associated with different reliabilities (for example, due to a payload size, a quantity of RBs, or a quantity of symbols associated with the PSFCH format). Therefore, different PSFCH formats may be associated with different power offset values. The first UE 605 may identify the PSFCH format that is associated with the sidelink feedback transmission and may apply the power offset value (for example, indicated by the configuration information) that is associated with the PSFCH format to determine the transmit power for the sidelink feedback transmission. For example, the transmit power for the sidelink feedback transmission may be defined as $P_{PSFCH}=P_{0,PSFCH}+10 \log(2^\mu M)+PL+\Delta_{F\_PSFCH}$.

In some aspects, the transmit power for the sidelink feedback transmission may be based at least in part on an MCS offset value, $\Delta_{TF}$. The MCS offset value may be based at least in part on a code rate of the PSFCH used to transmit the sidelink feedback transmission. In some aspects, the MCS offset value may be based at least in part on the quantity of symbols associated with the sidelink feedback transmission, the size of the sidelink feedback transmission, or a quantity ($Z_{RE}$) of resource elements (REs) associated with the sidelink feedback transmission, among other examples. In some aspects, the MCS offset value may be based at least in part on the PSFCH format used by the sidelink feedback transmission. For example, for a first PSFCH format (for example, PSFCH format 0, as defined or otherwise fixed, by a wireless communication standard), the MCS offset value may be based at least in part on the quantity of symbols associated with the sidelink feedback transmission. For example, for the PSFCH format 0, the MCS offset value may be defined as $$\Delta_{TF} = 10\log\left(\frac{2}{N}\right).$$

For a second PSFCH format (for example, PSFCH format 1, as defined or otherwise fixed, by a wireless communication standard), the MCS offset value may be based at least in part on the quantity of symbols associated with the sidelink feedback transmission and the size of the sidelink feedback transmission. For example, for the PSFCH format 1, with a normal cyclic prefix (CP), the MCS offset value may be defined as $$\Delta_{TF} = 10\log\left(\frac{14}{N}\right) + 10\log L.$$

For the PSFCH format 1, with an extended CP, the MCS offset value may be defined as $\Delta_{TF}=$ $$10\log\left(\frac{12}{N}\right) + 10\log L.$$

For PSFCH formats 2, 3, or 4 (for example, as defined or otherwise fixed, by a wireless communication standard), the MCS offset value may be based at least in part on the quantity ($Z_{RE}$) of REs associated with, or available for, the sidelink feedback transmission. For example, for PSFCH formats 2, 3, or 4 that are not associated with a cyclic redundancy check (CRC), or with a size less than or equal to a threshold (for example, the threshold may be 11 bits), the MCS offset value may be defined as $$\Delta_{TF} = 10\log\left(6\frac{L}{Z_{RE}}\right).$$

For PSFCH formats 2, 3, or 4 that are associated with a CRC, or with a size greater than a threshold (for example, the threshold may be 11 bits), the MCS offset value may be defined as $\Delta_{TF}=10 \log(2^{2.4 BPRE}-1)$, where the bits per RE (BPRE) is equal to $$\frac{L + L_{CRC}}{Z_{RE}},$$

where $L_{CRC}$ is a quantity of CRC bits.

In some aspects, the transmit power for the sidelink feedback transmission may be based at least in part on one or more closed-loop power control parameters. For example, the first UE 605 may receive an indication of one or more closed-loop power control parameters for the PSFCH used to transmit the sidelink feedback transmission (for example, via the configuration information). "Closed-loop power control parameter" may also be referred to as a "closed-loop power control command." For example, the transmit power for the sidelink feedback transmission may be defined as $P_{PSFCH}=P_{0,PSFCH}+P_{0,PSFCH}10 \log(2^\mu M)+PL+\Delta_{F\_PSFCH}+X$, where X is the one or more closed-loop power control parameters.

In some aspects, in a third operation 625, the first UE 605 may determine a transmit power for multiple sidelink feedback transmissions. For example, the first UE 605 may determine a transmit power for multiple sidelink feedback transmissions that are to be simultaneously transmitted by the first UE 605. In some aspects, for each sidelink feedback transmission of the multiple sidelink feedback transmissions, the first UE 605 may determine (for example, individually) a transmit power in a similar manner as described in connection with the second operation 620. In some aspects, a quantity of the multiple sidelink feedback transmission may be subject to a restriction. For example, the first UE 605 may be configured to be enabled to transmit up to S sidelink feedback transmissions simultaneously. In some aspects, a different value of S may be configured for each PSFCH format available, or configured, for the first UE 605. For example, the first UE 605 may be configured to be enabled to simultaneously transmit S sidelink feedback transmissions that all use the same PSFCH format. In other words, the quantity of the multiple sidelink feedback transmissions may be based at least in part on a format associated with each of the multiple sidelink feedback transmissions. As another example, a value for S may be configured for different combinations of PSFCH formats. For example, if the multiple sidelink feedback transmissions include sidelink feedback transmissions that use a first PSFCH format and sidelink feedback transmissions that use a second PSFCH format, then a first value for S may be used by the UE 120 (for example, to determine a maximum quantity of simultaneous sidelink feedback transmissions allowed). If the multiple sidelink feedback transmissions include sidelink feedback transmissions that use a first PSFCH format and sidelink feedback transmissions that use a third PSFCH format, then a second value for S may be used by the UE 120 (for example, to determine a maximum quantity of simultaneous sidelink feedback transmissions allowed). In other words, the quantity of the multiple sidelink feedback transmissions is based at least in part on a combination of formats associated with the multiple sidelink feedback transmissions.

In some aspects, the first UE 605 may prioritize certain sidelink feedback transmissions included in the multiple sidelink feedback transmissions. For example, the first UE 605 may determine a prioritized order of the multiple sidelink feedback transmissions. The prioritized order may be based at least in part on a priority (for example, a logical channel priority) of the multiple sidelink feedback transmissions, a size of each of the multiple sidelink feedback transmissions, or the PSFCH formats used for the multiple sidelink feedback transmissions, among other examples. The first UE 605 may determine a transmit power for each of the multiple sidelink feedback transmissions (for example, in a similar manner as described in connection with the second operation 620) sequentially in the prioritized order. In some aspects, the first UE 605 may select one or more (or all) sidelink feedback transmissions, from the multiple sidelink feedback transmissions, to be transmitted by the first UE 605 based at least in part on a maximum transmit power level of the first UE 605. For example, the first UE 605 may select feedback transmissions (for example, starting at a first sidelink feedback transmission and ascending down a list in the prioritized order) until an aggregated or accumulated transmit power (for example, a combined transmit power) of the selected feedback transmissions exceeds the maximum transmit power level of the first UE 605. In other words, the first UE 605 may select sidelink feedback transmissions in accordance with the prioritized order and ensuring that the aggregated transmit power of the selected sidelink feedback transmissions does not exceed the maximum transmit power level of the first UE 605. In other words, the first UE 605 may transmit the multiple sidelink feedback transmissions in accordance with the prioritized order based at least in part on an accumulated transmit power of the multiple sidelink feedback transmissions satisfying a value that is based at least in part on a transmit power capability associated with the first UE 605.

In some aspects, the first UE 605 may use the same transmit power for each of the multiple sidelink feedback transmissions (for example, that are selected or transmitted by the first UE 605). For example, the first UE 605 may divide the aggregated or the accumulated transmit power for the multiple sidelink feedback transmissions by the quantity of the multiple sidelink feedback transmissions to obtain an average transmit power. The first UE 605 may transmit each sidelink feedback transmission included in the multiple sidelink feedback transmissions using the average transmit power. As another example, the first UE 605 may determine whether the transmit powers of multiple sidelink feedback transmissions are all within a threshold amount of one another. For example, the multiple sidelink feedback transmissions may include a first sidelink feedback transmission, associated with a first transmit power (for example, determined in a similar manner as described in connection with the second operation 620), and a second sidelink feedback transmission associated with a second transmit power. The first UE 605 may determine whether a difference between the first transmit power and the second transmit power satisfies a threshold. If the difference satisfies the threshold, then the first UE 605 may simultaneously transmit the first sidelink feedback transmission and the second sidelink feedback transmission. If the difference does not satisfy the threshold, then the first UE 605 may transmit only one of the first sidelink feedback transmission or the second sidelink feedback transmission (for example, the first UE 605 may transmit the sidelink feedback transmission that is associated with a higher priority). As another example, the first UE 605 may identify a transmit power for a sidelink feedback transmission, of the multiple sidelink feedback transmissions, that is associated with a highest priority among the multiple sidelink feedback transmissions. The first UE 605 may determine differences between the transmit power for the highest priority sidelink feedback transmission and transmit powers of other sidelink feedback transmissions of the multiple sidelink feedback transmissions. If the differences satisfy the threshold, then the other sidelink feedback transmissions may be simultaneously transmitted with the highest priority sidelink feedback transmission. If a difference (for example, between the transmit power for the highest priority sidelink feedback transmission and a transmit power of another sidelink feedback transmission) does not satisfy the threshold, then the other sidelink feedback transmissions may not be transmitted (for example, may be dropped).

Alternatively, the first UE 605 may use a different transmit power for each of the multiple sidelink feedback transmissions. For example, the first UE 605 may transmit (for example, in a fourth operation 630) the multiple sidelink feedback transmissions using a different transmit power for each of the multiple sidelink feedback transmissions. In some aspects, the first UE 605 may be configured to be enabled to use the same (or similar, such as within a threshold of one another) transmit power for each of the multiple sidelink feedback transmissions or to be enabled to use a different transmit power for each of the multiple sidelink feedback transmissions. For example, the first UE 605 may transmit (for example, in the fourth operation 630) the multiple sidelink feedback transmissions using a same transmit power level for each of the multiple sidelink feedback transmissions or a different transmit power level for each of the multiple sidelink feedback transmissions. In some aspects, whether the same (or similar) transmit power or different transmit powers are used for the multiple sidelink feedback transmissions may be based at least in part on a capability of the first UE 605, or a frequency gap between each of the multiple sidelink feedback transmissions, among other examples. For example, the first UE 605 may use the same (or similar) transmit power if the frequency gap is larger than a frequency gap threshold and may use different transmit powers if the frequency gap is less than or equal to the frequency gap threshold.

In the fourth operation 630, the first UE 605 may transmit the sidelink feedback transmission, in accordance with the configuration information, using the transmit power level (for example, that is determined in a similar manner as described in connection with the second operation 620). In some aspects, the first UE 605 may simultaneously transmit multiple sidelink feedback transmissions. The first UE 605 may transmit the multiple sidelink feedback transmissions using the same (or similar) transmit power. In some other aspects, the first UE 605 may transmit the multiple sidelink feedback transmissions using different transmit power levels for one or more of the multiple sidelink feedback transmissions. In some aspects, the first UE 605 may transmit the sidelink feedback transmission to the second UE 610 using the PSFCH. For example, the second UE 610 may have transmitted a sidelink communication for which the sidelink feedback transmission is providing feedback. In some aspects, the first UE 605 may transmit the multiple sidelink feedback transmissions to the second UE 610 and one or more other UEs (not shown in FIG. 6).

Figure 7:
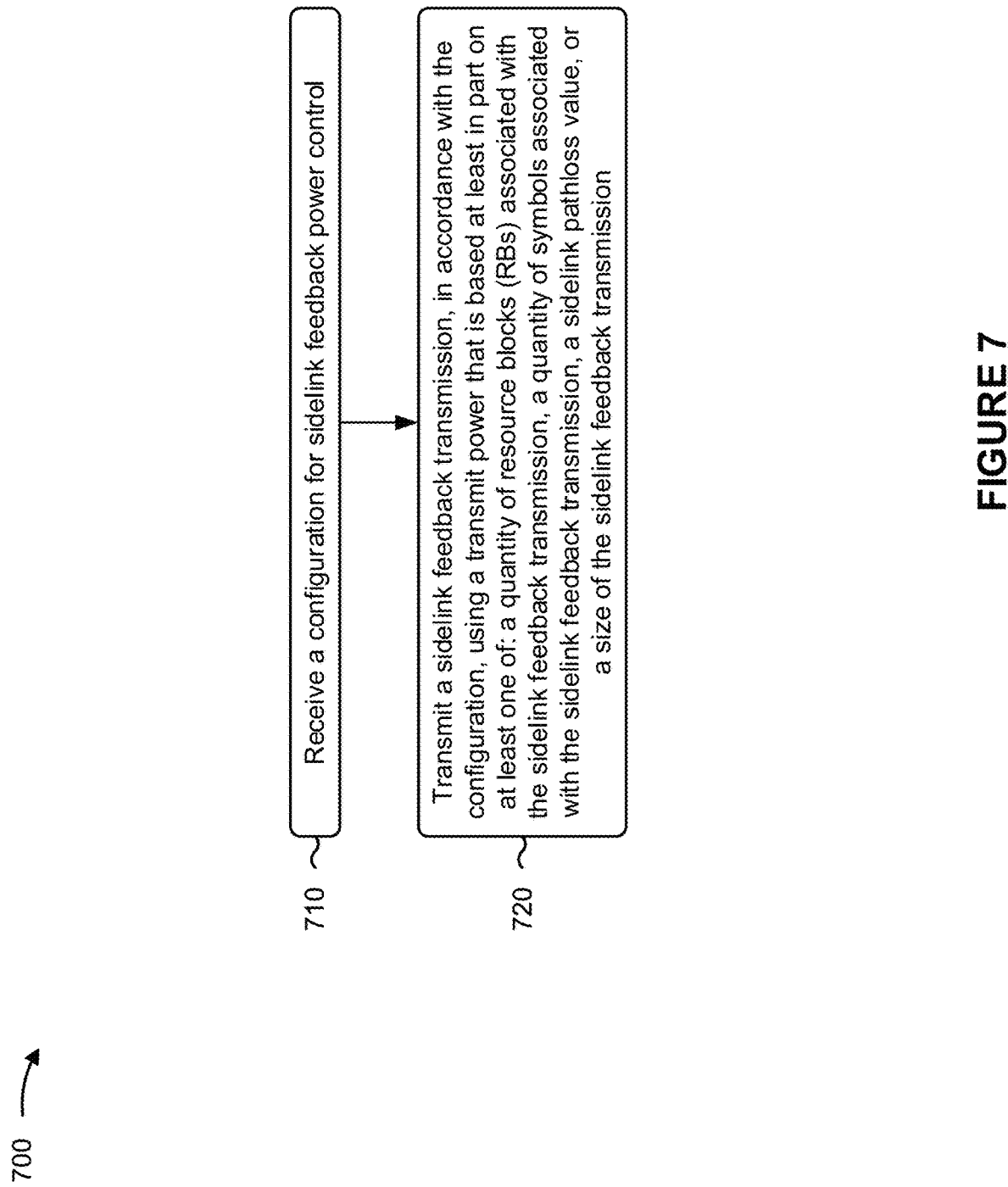
FIG. 7 is a flowchart illustrating an example process performed, for example, by a UE associated with power control for sidelink feedback transmissions, in accordance with the present disclosure.

FIG. 7 is a flowchart illustrating an example process 700 performed, for example, by a UE in accordance with the present disclosure. Example process 700 is an example where the UE (for example, UE 120 or the first UE 605) performs operations associated with power control for sidelink feedback transmissions.

As shown in FIG. 7, in some aspects, process 700 may include receiving a configuration for sidelink feedback power control (block 710). For example, the UE (such as by using communication manager 140 or reception component 802, depicted in FIG. 8) may receive a configuration for sidelink feedback power control, as described above.

As further shown in FIG. 7, in some aspects, process 700 may include transmitting a sidelink feedback transmission, in accordance with the configuration, using a transmit power that is based at least in part on at least one of: a quantity of RBs associated with the sidelink feedback transmission, a quantity of symbols associated with the sidelink feedback transmission, a sidelink pathloss value, or a size of the sidelink feedback transmission (block 720). For example, the UE (such as by using communication manager 140 or transmission component 804, depicted in FIG. 8) may transmit a sidelink feedback transmission, in accordance with the configuration, using a transmit power that is based at least in part on at least one of: a quantity of RBs associated with the sidelink feedback transmission, a quantity of symbols associated with the sidelink feedback transmission, a sidelink pathloss value, or a size of the sidelink feedback transmission, as described above.

Process 700 may include additional aspects, such as any single aspect or any combination of aspects described below or in connection with one or more other processes described elsewhere herein.

In a first additional aspect, the size of the sidelink feedback transmission is based at least in part on a size of information associated with at least one of sidelink HARQ feedback, a scheduling request, a CSI report, or an inter-UE coordination message.

In a second additional aspect, alone or in combination with the first aspect, the quantity of symbols associated with the sidelink feedback transmission does not include any symbols associated with AGC associated with the sidelink feedback transmission.

In a third additional aspect, alone or in combination with one or more of the first and second aspects, the transmit power is further based at least in part on a nominal transmit power for sidelink feedback transmissions, and the nominal transmit power is associated with at least one of a BWP associated with the sidelink feedback transmission, a sidelink resource pool associated with the sidelink feedback transmission, or a serving cell associated with the UE.

In a fourth additional aspect, alone or in combination with one or more of the first through third aspects, process 700 includes receiving, from a base station, an indication of the nominal transmit power.

In a fifth additional aspect, alone or in combination with one or more of the first through fourth aspects, the transmit power is further based at least in part on a nominal transmit power for sidelink feedback transmissions, and the nominal transmit power is based at least in part on a first nominal transmit power that is associated with a cell or a sidelink resource pool, and a second nominal transmit power that is associated with the UE.

In a sixth additional aspect, alone or in combination with one or more of the first through fifth aspects, the second nominal transmit power is based at least in part on a capability of the UE.

In a seventh additional aspect, alone or in combination with one or more of the first through sixth aspects, the transmit power is based at least in part on a nominal transmit power, the quantity of RBs associated with the sidelink feedback transmission, and a subcarrier spacing associated with the sidelink feedback transmission.

In an eighth additional aspect, alone or in combination with one or more of the first through seventh aspects, the transmit power is further based at least in part on at least one of the sidelink pathloss value or a downlink pathloss value.

In a ninth additional aspect, alone or in combination with one or more of the first through eighth aspects, process 700 includes receiving, from a base station, an indication of an open loop power control parameter associated with sidelink pathloss compensation for a physical sidelink feedback channel, and the transmit power is based at least in part on the sidelink pathloss value based at least in part on receiving the indication of the open loop power control parameter associated with sidelink pathloss compensation.

In a tenth additional aspect, alone or in combination with one or more of the first through ninth aspects, process 700 includes receiving, from a base station, an indication of an open loop power control parameter associated with downlink pathloss compensation, and the transmit power is based at least in part on a downlink pathloss value based at least in part on receiving the indication of the open loop power control parameter associated with downlink pathloss compensation.

In an eleventh additional aspect, alone or in combination with one or more of the first through tenth aspects, the transmit power is based at least in part on the sidelink pathloss value or a downlink pathloss value based at least in part on a comparison of the sidelink pathloss value to the downlink pathloss value.

In a twelfth additional aspect, alone or in combination with one or more of the first through eleventh aspects, the sidelink feedback transmission is associated with a PSFCH format, and the transmit power is based at least in part on a power offset value that is based at least in part on the PSFCH format.

In a thirteenth additional aspect, alone or in combination with one or more of the first through twelfth aspects, the transmit power is further based at least in part on an MCS offset value.

In a fourteenth additional aspect, alone or in combination with one or more of the first through thirteenth aspects, the MCS offset value is based at least in part on a code rate of a PSFCH used to transmit the sidelink feedback transmission.

In a fifteenth additional aspect, alone or in combination with one or more of the first through fourteenth aspects, the MCS offset value is based at least in part on at least one of the quantity of symbols associated with the sidelink feedback transmission, the size of the sidelink feedback transmission, or a quantity of REs associated with the sidelink feedback transmission.

In a sixteenth additional aspect, alone or in combination with one or more of the first through fifteenth aspects, process 700 includes receiving an indication of one or more closed-loop power control parameters for a PSFCH used to transmit the sidelink feedback transmission, and the transmit power is based at least in part on the one or more closed-loop power control parameters.

In a seventeenth additional aspect, alone or in combination with one or more of the first through sixteenth aspects, transmitting the sidelink feedback transmission includes transmitting multiple sidelink feedback transmissions, including the sidelink feedback transmission, and the multiple sidelink feedback transmissions at least partially overlap in a time domain.

In an eighteenth additional aspect, alone or in combination with one or more of the first through seventeenth aspects, a quantity of the multiple sidelink feedback transmissions is based at least in part on a format associated with each of the multiple sidelink feedback transmissions.

In a nineteenth additional aspect, alone or in combination with one or more of the first through eighteenth aspects, a quantity of the multiple sidelink feedback transmissions is based at least in part on a combination of formats associated with the multiple sidelink feedback transmissions.

In a twentieth additional aspect, alone or in combination with one or more of the first through nineteenth aspects, the multiple sidelink feedback transmissions are associated with a prioritized order, and each sidelink feedback transmission, of the multiple sidelink feedback transmissions, is associated with a separate transmit power.

In a twenty-first additional aspect, alone or in combination with one or more of the first through twentieth aspects, transmitting the multiple sidelink feedback transmissions includes transmitting the multiple sidelink feedback transmissions in accordance with the prioritized order based at least in part on an accumulated transmit power of the multiple sidelink feedback transmissions satisfying a value that is based at least in part on a transmit power capability associated with the UE.

In a twenty-second additional aspect, alone or in combination with one or more of the first through twenty-first aspects, the multiple sidelink feedback transmissions include the sidelink feedback transmission and another sidelink feedback transmission, and transmitting the multiple sidelink feedback transmissions includes transmitting the multiple sidelink feedback transmissions based at least in part on a difference between the transmit power and another transmit power, of the other sidelink feedback transmission, satisfying a threshold.

In a twenty-third additional aspect, alone or in combination with one or more of the first through twenty-second aspects, transmitting the multiple sidelink feedback transmissions includes transmitting the multiple sidelink feedback transmissions using the transmit power for each of the multiple sidelink feedback transmissions.

In a twenty-fourth additional aspect, alone or in combination with one or more of the first through twenty-third aspects, the transmit power is further based at least in part on an accumulated transmit power of the multiple sidelink feedback transmissions divided by a quantity of the multiple sidelink feedback transmissions.

In a twenty-fifth additional aspect, alone or in combination with one or more of the first through twenty-fourth aspects, transmitting the multiple sidelink feedback transmissions includes transmitting the multiple sidelink feedback transmissions using a different transmit power for each of the multiple sidelink feedback transmissions.

In a twenty-sixth additional aspect, alone or in combination with one or more of the first through twenty-fifth aspects, transmitting the multiple sidelink feedback transmissions includes transmitting the multiple sidelink feedback transmissions using a same transmit power level for each of the multiple sidelink feedback transmissions, or a different transmit power level for each of the multiple sidelink feedback transmissions, based at least in part on a capability of the UE or a frequency gap between each of the multiple sidelink feedback transmissions.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

FIG. 8 is a diagram of an example apparatus 800 for wireless communication in accordance with the present disclosure. The apparatus 800 may be a UE, or a UE may include the apparatus 800. In some aspects, the apparatus 800 includes a reception component 802, a transmission component 804, and a communication manager 140, which may be in communication with one another (for example, via one or more buses). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIG. 6. Additionally or alternatively, the apparatus 800 may be configured to perform one or more processes described herein, such as process 700 of FIG. 7, or a combination thereof. In some aspects, the apparatus 800 may include one or more components of the UE described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, the communication manager 140 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The communication manager 140 may receive or may cause the reception component 802 to receive a configuration for sidelink feedback power control. The communication manager 140 may transmit or may cause the transmission component 804 to transmit a sidelink feedback transmission, in accordance with the configuration, using a transmit power that is based at least in part on at least one of: a quantity of RB s associated with the sidelink feedback transmission, a quantity of symbols associated with the sidelink feedback transmission, a sidelink pathloss value, or a size of the sidelink feedback transmission. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a transmit power determination component 808, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive a configuration for sidelink feedback power control. The transmission component 804 may transmit a sidelink feedback transmission, in accordance with the configuration, using a transmit power that is based at least in part on at least one of: a quantity of RBs associated with the sidelink feedback transmission, a quantity of symbols associated with the sidelink feedback transmission, a sidelink pathloss value, or a size of the sidelink feedback transmission.

The transmit power determination component 808 may determine the transmit power for the sidelink feedback transmission. The transmit power determination component 808 may determine the transmit power for the sidelink feedback transmission based at least in part on the configuration.

The reception component 802 may receive, from a base station, an indication of a nominal transmit power.

The reception component 802 may receive, from a base station, an indication of an open loop power control parameter associated with sidelink pathloss compensation for a physical sidelink feedback channel, wherein the transmit power is based at least in part on the sidelink pathloss value based at least in part on receiving the indication of the open loop power control parameter associated with sidelink pathloss compensation.

The reception component 802 may receive, from a base station, an indication of an open loop power control parameter associated with downlink pathloss compensation, wherein the transmit power is based at least in part on a downlink pathloss value based at least in part on receiving the indication of the open loop power control parameter associated with downlink pathloss compensation.

The reception component 802 may receive an indication of one or more closed-loop power control parameters for a PSFCH used to transmit the sidelink feedback transmission, wherein the transmit power is based at least in part on the one or more closed-loop power control parameters.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a configuration for sidelink feedback power control; and transmitting a sidelink feedback transmission, in accordance with the configuration, using a transmit power that is based at least in part on at least one of: a quantity of resource blocks (RBs) associated with the sidelink feedback transmission, a quantity of symbols associated with the sidelink feedback transmission, a sidelink pathloss value, or a size of the sidelink feedback transmission.

Aspect 2: The method of Aspect 1, wherein the size of the sidelink feedback transmission is based at least in part on a size of information associated with at least one of: sidelink hybrid automatic repeat request (HARQ) feedback, a scheduling request, a channel state information (CSI) report, or an inter-UE coordination message.

Aspect 3: The method of any of Aspects 1-2, wherein the quantity of symbols associated with the sidelink feedback transmission does not include any symbols associated with automatic gain control (AGC) associated with the sidelink feedback transmission.

Aspect 4: The method of any of Aspects 1-3, wherein the transmit power is further based at least in part on a nominal transmit power for sidelink feedback transmissions, and wherein the nominal transmit power is associated with at least one of: a bandwidth part (BWP) associated with the sidelink feedback transmission, a sidelink resource pool associated with the sidelink feedback transmission, or a serving cell associated with the UE.

Aspect 5: The method of any of Aspects 1-4, further comprising receiving, from a base station, an indication of a nominal transmit power.

Aspect 6: The method of any of Aspects 1-5, wherein the transmit power is further based at least in part on a nominal transmit power for sidelink feedback transmissions, and wherein the nominal transmit power is based at least in part on a first nominal transmit power that is associated with a cell or a sidelink resource pool, and a second nominal transmit power that is associated with the UE.

Aspect 7: The method of Aspect 6, wherein the second nominal transmit power is based at least in part on a capability of the UE.

Aspect 8: The method of any of Aspects 1-7, wherein the transmit power is based at least in part on a nominal transmit power, the quantity of RBs associated with the sidelink feedback transmission, and a subcarrier spacing associated with the sidelink feedback transmission.

Aspect 9: The method of Aspect 8, wherein the transmit power is further based at least in part on at least one of the sidelink pathloss value or a downlink pathloss value.

Aspect 10: The method of any of Aspects 1-9, further comprising receiving, from a base station, an indication of an open loop power control parameter associated with sidelink pathloss compensation for a physical sidelink feedback channel, and wherein the transmit power is based at least in part on the sidelink pathloss value based at least in part on receiving the indication of the open loop power control parameter associated with sidelink pathloss compensation.

Aspect 11: The method of any of Aspects 1-10, further comprising receiving, from a base station, an indication of an open loop power control parameter associated with downlink pathloss compensation, and wherein the transmit power is based at least in part on a downlink pathloss value based at least in part on receiving the indication of the open loop power control parameter associated with downlink pathloss compensation.

Aspect 12: The method of any of Aspects 1-11, wherein the transmit power is based at least in part on the sidelink pathloss value or a downlink pathloss value based at least in part on a comparison of the sidelink pathloss value to the downlink pathloss value.

Aspect 13: The method of any of Aspects 1-12, wherein the sidelink feedback transmission is associated with a physical sidelink feedback channel (PSFCH) format, and wherein the transmit power is based at least in part on a power offset value that is based at least in part on the PSFCH format.

Aspect 14: The method of any of Aspects 1-13, wherein the transmit power is further based at least in part on a modulation and coding scheme (MCS) offset value.

Aspect 15: The method of Aspect 14, wherein the MCS offset value is based at least in part on a code rate of a physical sidelink feedback channel (PSFCH) used to transmit the sidelink feedback transmission.

Aspect 16: The method of any of Aspects 14-15, wherein the MCS offset value is based at least in part on at least one of: the quantity of symbols associated with the sidelink feedback transmission, the size of the sidelink feedback transmission, or a quantity of resource elements (REs) associated with the sidelink feedback transmission.

Aspect 17: The method of any of Aspects 1-16, further comprising receiving an indication of one or more closed-loop power control parameters for a physical sidelink feedback channel (PSFCH) used to transmit the sidelink feedback transmission, and wherein the transmit power is based at least in part on the one or more closed-loop power control parameters.

Aspect 18: The method of any of Aspects 1-17, wherein transmitting the sidelink feedback transmission comprises transmitting multiple sidelink feedback transmissions, including the sidelink feedback transmission, wherein the multiple sidelink feedback transmissions at least partially overlap in a time domain.

Aspect 19: The method of Aspect 18, wherein a quantity of the multiple sidelink feedback transmissions is based at least in part on a format associated with each of the multiple sidelink feedback transmissions.

Aspect 20: The method of any of Aspects 18-19, wherein a quantity of the multiple sidelink feedback transmissions is based at least in part on a combination of formats associated with the multiple sidelink feedback transmissions.

Aspect 21: The method of any of Aspects 18-20, wherein the multiple sidelink feedback transmissions are associated with a prioritized order, and wherein each sidelink feedback transmission, of the multiple sidelink feedback transmissions, is associated with a separate transmit power.

Aspect 22: The method of Aspect 21, wherein transmitting the multiple sidelink feedback transmissions comprises transmitting the multiple sidelink feedback transmissions in accordance with the prioritized order based at least in part on an accumulated transmit power of the multiple sidelink feedback transmissions satisfying a value that is based at least in part on a transmit power capability associated with the UE.

Aspect 23: The method of any of Aspects 18-22, wherein the multiple sidelink feedback transmissions include the sidelink feedback transmission and another sidelink feedback transmission, and wherein transmitting the multiple sidelink feedback transmissions comprises transmitting the multiple sidelink feedback transmissions based at least in part on a difference between the transmit power and another transmit power, of the other sidelink feedback transmission, satisfying a threshold.

Aspect 24: The method of any of Aspects 18-23, wherein transmitting the multiple sidelink feedback transmissions comprises transmitting the multiple sidelink feedback transmissions using the transmit power for each of the multiple sidelink feedback transmissions.

Aspect 25: The method of Aspect 24, wherein the transmit power is further based at least in part on an accumulated transmit power of the multiple sidelink feedback transmissions divided by a quantity of the multiple sidelink feedback transmissions.

Aspect 26: The method of any of Aspects 18-25, wherein transmitting the multiple sidelink feedback transmissions comprises transmitting the multiple sidelink feedback transmissions using a different transmit power for each of the multiple sidelink feedback transmissions.

Aspect 27: The method of any of Aspects 18-26, wherein transmitting the multiple sidelink feedback transmissions comprises transmitting the multiple sidelink feedback transmissions using: a same transmit power level for each of the multiple sidelink feedback transmissions, or a different transmit power level for each of the multiple sidelink feedback transmissions, based at least in part on a capability of the UE or a frequency gap between each of the multiple sidelink feedback transmissions.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   one or more memories storing processor-readable code; and
   one or more processors coupled with the one or more memories and operable to cause the UE to:
      receive a configuration for sidelink feedback power control that indicates a first transmit power for sidelink feedback transmissions; and
      transmit a sidelink feedback transmission, in accordance with the configuration, using a second transmit power that is based at least in part on the first transmit power and an offset value applied to the first transmit power to determine the second transmit power, wherein the offset value is based at least in part on at least one of: a quantity of resource blocks (RBs) associated with the sidelink feedback transmission, a quantity of symbols associated with the sidelink feedback transmission, a sidelink pathloss value, or a size of the sidelink feedback transmission.

2. The UE of claim 1, wherein the first transmit power is a nominal transmit power for sidelink feedback transmissions, and wherein the nominal transmit power is associated with at least one of:
   a bandwidth part (BWP) associated with the sidelink feedback transmission, a sidelink resource pool associated with the sidelink feedback transmission, or
   a serving cell associated with the UE.

3. The UE of claim 1, wherein the first transmit power is a nominal transmit power for sidelink feedback transmissions, and wherein the nominal transmit power is based at least in part on a first nominal transmit power that is associated with a cell or a sidelink resource pool, and a second nominal transmit power that is associated with the UE.

4. The UE of claim 1, wherein the first transmit power is a nominal transmit power, and wherein the second transmit power is based at least in part on the nominal transmit power, the quantity of RBs associated with the sidelink feedback transmission, and a subcarrier spacing associated with the sidelink feedback transmission.

5. The UE of claim 4, wherein the second transmit power is further based at least in part on at least one of the sidelink pathloss value or a downlink pathloss value.

6. The UE of claim 1, wherein the one or more processors are further operable to cause the UE to receive, from a network entity, an indication of an open loop power control parameter associated with sidelink pathloss compensation for a physical sidelink feedback channel, and wherein the second transmit power is based at least in part on the sidelink pathloss value based at least in part on receiving the indication of the open loop power control parameter associated with sidelink pathloss compensation.

7. The UE of claim 1, wherein the one or more processors are further operable to cause the UE to receive, from a network entity, an indication of an open loop power control parameter associated with downlink pathloss compensation, and wherein the second transmit power is based at least in part on a downlink pathloss value based at least in part on receiving the indication of the open loop power control parameter associated with downlink pathloss compensation.

8. The UE of claim 1, wherein the second transmit power is based at least in part on the sidelink pathloss value or a downlink pathloss value based at least in part on a comparison of the sidelink pathloss value to the downlink pathloss value.

9. The UE of claim 1, wherein the sidelink feedback transmission is associated with a physical sidelink feedback channel (PSFCH) format, and wherein the offset value is based at least in part on the PSFCH format.

10. The UE of claim 1, wherein, to cause the UE to transmit the sidelink feedback transmission, the one or more processors are operable to cause the UE to transmit multiple sidelink feedback transmissions, including the sidelink feedback transmission, wherein the multiple sidelink feedback transmissions at least partially overlap in a time domain.

11. The UE of claim 10, wherein a quantity of the multiple sidelink feedback transmissions is based at least in part on a format associated with each of the multiple sidelink feedback transmissions.

12. The UE of claim 10, wherein the multiple sidelink feedback transmissions include the sidelink feedback transmission and another sidelink feedback transmission, and wherein, to cause the UE to transmit the multiple sidelink feedback transmissions, the one or more processors are operable to cause the UE to transmit the multiple sidelink feedback transmissions based at least in part on a difference between the second transmit power and another transmit power, of the other sidelink feedback transmission, satisfying a threshold.

13. The UE of claim 10, wherein, to cause the UE to transmit the multiple sidelink feedback transmissions, the one or more processors are operable to cause the UE to transmit the multiple sidelink feedback transmissions using the second transmit power for each of the multiple sidelink feedback transmissions.

14. The UE of claim 10, wherein, to cause the UE to transmit the multiple sidelink feedback transmissions, the one or more processors are operable to cause the UE to transmit the multiple sidelink feedback transmissions using a different transmit power for each of the multiple sidelink feedback transmissions.

15. The UE of claim 10, wherein, to cause the UE to transmit the multiple sidelink feedback transmissions, the one or more processors are operable to cause the UE to transmit the multiple sidelink feedback transmissions using:
   a same transmit power level for each of the multiple sidelink feedback transmissions, or
   a different transmit power level for each of the multiple sidelink feedback transmissions,
   wherein transmitting the multiple sidelink feedback transmissions using the same transmit power level or the different transmit power level is based at least in part on a capability of the UE or a frequency gap between each of the multiple sidelink feedback transmissions.

16. A method of wireless communication performed by a user equipment (UE), comprising:
   receiving a configuration for sidelink feedback power control that indicates a first transmit power for sidelink feedback transmissions; and
   transmitting a sidelink feedback transmission, in accordance with the configuration, using a second transmit power that is based at least in part on the first transmit power and an offset value applied to the first transmit power to determine the second transmit power, wherein the offset value is based at least in part on at least one of: a quantity of resource blocks (RBs) associated with the sidelink feedback transmission, a quantity of symbols associated with the sidelink feedback transmission, a sidelink pathloss value, or a size of the sidelink feedback transmission.

17. The method of claim 16, wherein the quantity of the symbols associated with the sidelink feedback transmission does not include any symbols associated with automatic gain control (AGC) associated with the sidelink feedback transmission.

18. The method of claim 16, wherein the first transmit power is a nominal transmit power for sidelink feedback transmissions, and wherein the nominal transmit power is associated with at least one of:
   a bandwidth part (BWP) associated with the sidelink feedback transmission, a sidelink resource pool associated with the sidelink feedback transmission, or
   a serving cell associated with the UE.

19. The method of claim 16, wherein the first transmit power is a nominal transmit power for sidelink feedback transmissions, and wherein the nominal transmit power is based at least in part on a first nominal transmit power that is associated with a cell or a sidelink resource pool, and a second nominal transmit power that is associated with the UE.

20. The method of claim 16, wherein the first transmit power is a nominal transmit power, and wherein the second transmit power is based at least in part on the nominal transmit power, the quantity of RBs associated with the sidelink feedback transmission, and a subcarrier spacing associated with the sidelink feedback transmission.

21. The method of claim 16, further comprising receiving, from a network entity, an indication of an open loop power control parameter associated with sidelink pathloss compensation for a physical sidelink feedback channel, and wherein the second transmit power is based at least in part on the sidelink pathloss value based at least in part on receiving the indication of the open loop power control parameter associated with sidelink pathloss compensation.

22. The method of claim 16, further comprising receiving, from a network entity, an indication of an open loop power control parameter associated with downlink pathloss compensation, and wherein the second transmit power is based at least in part on a downlink pathloss value based at least in part on receiving the indication of the open loop power control parameter associated with downlink pathloss compensation.

23. The method of claim 16, wherein the second transmit power is based at least in part on the sidelink pathloss value or a downlink pathloss value based at least in part on a comparison of the sidelink pathloss value to the downlink pathloss value.

24. The method of claim 16, wherein the second transmit power is further based at least in part on a modulation and coding scheme (MCS) offset value.

25. The method of claim 16, wherein transmitting the sidelink feedback transmission comprises transmitting multiple sidelink feedback transmissions, including the sidelink feedback transmission, wherein the multiple sidelink feedback transmissions at least partially overlap in a time domain.

26. The method of claim 25, wherein a quantity of the multiple sidelink feedback transmissions is based at least in part on a format associated with each of the multiple sidelink feedback transmissions.

27. The method of claim 25, wherein a quantity of the multiple sidelink feedback transmissions is based at least in part on a combination of formats associated with the multiple sidelink feedback transmissions.

28. The method of claim 25, wherein the multiple sidelink feedback transmissions are associated with a prioritized order, and wherein each sidelink feedback transmission, of the multiple sidelink feedback transmissions, is associated with a separate transmit power.

29. The method of claim 25, wherein transmitting the multiple sidelink feedback transmissions comprises transmitting the multiple sidelink feedback transmissions using the second transmit power for each of the multiple sidelink feedback transmissions.

30. The method of claim 25, wherein transmitting the multiple sidelink feedback transmissions comprises transmitting the multiple sidelink feedback transmissions using a different transmit power for each of the multiple sidelink feedback transmissions.

* * * * *